(12) United States Patent
Barrett et al.

(10) Patent No.: US 12,521,415 B2
(45) Date of Patent: *Jan. 13, 2026

(54) ACCELERATING REPAIR OF MUCOSAL INJURY USING GOLD(III) COMPOUNDS

(71) Applicant: University of Kentucky Research Foundation, Lexington, KY (US)

(72) Inventors: Terrence Barrett, Lexington, KY (US); Samuel Awuah, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 387 days.

This patent is subject to a terminal disclaimer.

(21) Appl. No.: 18/006,889

(22) PCT Filed: Jul. 29, 2021

(86) PCT No.: PCT/US2021/043774
§ 371 (c)(1),
(2) Date: Jan. 26, 2023

(87) PCT Pub. No.: WO2022/026757
PCT Pub. Date: Feb. 3, 2022

(65) Prior Publication Data
US 2023/0277586 A1    Sep. 7, 2023

Related U.S. Application Data

(60) Provisional application No. 63/093,606, filed on Oct. 19, 2020, provisional application No. 63/058,092, filed on Jul. 29, 2020.

(51) Int. Cl.
*A61K 33/242* (2019.01)
*A61P 43/00* (2006.01)

(52) U.S. Cl.
CPC ............ *A61K 33/242* (2019.01); *A61P 43/00* (2018.01)

(58) Field of Classification Search
CPC ................ A61K 33/242; A61K 31/675; A61K 31/555; A61P 43/00; A61P 35/00
See application file for complete search history.

(56) References Cited

U.S. PATENT DOCUMENTS

| | | |
|---|---|---|
| 2015/0315211 A1 | 11/2015 | Walensky et al. |
| 2016/0310490 A1 | 10/2016 | Blomgren et al. |
| 2018/0161430 A1 | 6/2018 | Wood et al. |
| 2019/0151331 A1 | 5/2019 | Beardsley et al. |

*Primary Examiner* — Jessica Worsham
(74) *Attorney, Agent, or Firm* — Stites & Harbison PLLC; Mandy Wilson Decker

(57) ABSTRACT

A method of increasing mitochondrial respiration in a cell makes use of a compound having the structure of formula (I) or formula (II).

20 Claims, 31 Drawing Sheets

ACCELERATING REPAIR OF MUCOSAL INJURY USING GOLD(III) COMPOUNDS

RELATED APPLICATIONS

This application claims priority from U.S. Provisional Application Ser. No. 63/058,092, filed Jul. 29, 2020, and 63/093,606, filed Oct. 19, 2020, the entire disclosures of which are incorporated herein by this reference.

GOVERNMENT INTEREST

This invention was made with government support under grant number P20 GM130456-01A1 awarded by the National Institutes of Health and grant number 1I01CX001353-01A1 awarded by the Department of Veterans Affairs. The government has certain rights in the invention.

TECHNICAL FIELD

The presently-disclosed subject matter relates to methods of accelerating intestinal mucosal healing and repair. The presently-disclosed subject matter also relates to methods of treatment for inflammatory bowel disease (IBD) and coronavirus (COVID) induced enteritis.

INTRODUCTION

Inflammatory bowel disease (IBD) is a chronic illness that is estimated to affect more than 3.1 million patients in the United States. IBD requires costly lifelong medical therapy, and frequently results in hospitalization, surgery, and disability. Costs of care continue to rise, as supported by a recent cost analysis that reported an average cost of $26,555 during a patient's first year of diagnosis. Furthermore, IBD frequently impacts individuals in early and middle adulthood, which compounds the economic impact of disease. Disease remission is paramount for minimizing economic impact, and mucosal healing is the most significant predictor of stable remission. Without mucosal healing, IBD patients are at an increased risk for complications such as bowel obstruction, fistulas, surgeries, and colon cancer. A major concern for IBD patients is the increased risk of colorectal cancer (CRC), which is reported to be 2-fold to 5-fold higher than the general population. A study of VA patients with ulcerative colitis (UC) found that they had a higher risk of CRC than other US cohorts.

After intestinal injury, a transient class of repair cells is formed. These cells migrate into the wound defect, dedifferentiate, form pseudopodia-like structures, reorganize their cytoskeleton, and differentiate again after wound closure. This process has been termed epithelial restitution. These non-proliferative cells, referred to as wound-associated epithelial (WAE) cells, quickly migrate over the surface of intestinal wounds in response to a milieu of non-epithelial signals. Miyoshi et al showed dmPGE2 treatment of differentiated spheroids promoted expansion of WAE in vitro. WAE expressed relatively high levels of TCA cycle and respiratory electron transport gene mRNA, while seahorse studies favored a shift from glycolysis to oxidative phosphorylation. The subsequent repair phase requires enhanced proliferation within wound adjacent crypts to replace the crypts lost during severe damage. This has been investigated using Lgr5$^+$ ISC, and researchers detected relatively high levels of mitochondrial activity and oxidative phosphorylation (OXPHOS) to drive d differentiation. Likewise, Schell et al found that expression of mitochondrial biogenesis, TFAM and Nrf1, were higher in ISC. Their work revealed that mitochondrial OXPHOS activity drives ISC differentiation and crypt formation by a mechanism that involves p38 activation (a marker of ROS signaling). Together these studies illuminate the role of mitochondrial respiration in promoting the transition from pluripotent ISC to differentiated intestinal epithelial cell (IEC), but do not address the metabolic requirements required for ulcer healing in vivo.

Mitochondria are well known for their ability to produce ATP as cellular energy by creating an electrochemical gradient through electron transport chain (ETC). In addition, mitochondria function as a factory that actively participates in the biosynthesis of macromolecules via TCA cycle by using glucose, fatty acids and glutamine as metabolic fuels. By producing a large number of metabolites, recent studies have begun to unveil an emerging role of mitochondria as signaling organelles. Importantly, mitochondrial-derived ROS (mROS) are known to function as important signaling molecules that regulate diverse cellular processes; and changes in mtROS levels under pathological conditions alter signaling pathways in response to cellular stress. Emerging evidence suggests that mitochondria-mediated oxidative phosphorylation (OXPHOS) is required for intestinal stem cell (ISC) proliferation and differentiation. Mitochondrial dysfunction has been implicated in IBD. For example, TNF treatment decreases OXPHOS phosphorylation through phosphorylation of subunit 1 of cytochrome c oxidase. Other reports indicate that the activity of different mitochondrial complexes is decreased in biopsies of ulcerative colitis (UC) patients. However, the mechanisms by which mitochondria promote IEC survival and proliferation for ulcer healing remain largely unknown. Given the notion that re-epithelialization requires a rapid expansion of IEC to cover the ulcer surface, it is tempting to hypothesize that mitochondria are not only needed for the production of ATP and macromolecules to fuel proliferation but also for its capability of regulating growth and survival signals according to the metabolic requirement of IECs.

Redox state (reduction/oxidation) is the balance of reducing and oxidizing equivalents, which is known to be important in physiologic and pathological processes. Redox imbalance is due to altered levels of reactive oxygen species/reactive nitrogen species (ROS/RNS) and/or antioxidant proteins (APs). Major ROS/RNS include hydrogen peroxide ($H_2O_2$), hydroxyl radical, superoxide radical ($O_2^{·-}$), nitric oxide (NO·), and peroxynitrite (OONO$^-$). ROS/RNS regulate cell proliferation and apoptosis depending on the levels of generation, the spatial distribution, and subcellular compartment sites. APs are important parameters for regulation of ROS/RNS levels and govern target-specific transduction of redox signals. APs are compartmentalized and tightly controlled at both the genetic and activity levels. The major enzymatic antioxidants include superoxide dismutase (SOD), catalase (CAT), glutathione peroxidase (GPx), glutathione S transferase (GST), and glutaredoxin (Grx). These enzymes work in concert with thiol-redox couples to control ROS/RNS levels. A cell contains six major redox couples: NADH/NAD, NADPH/NADP, cysteine (Cys)/cystine (CySS), GSH/glutathione disulfide (GSSG), peroxiredoxin (Prx)-sulfiredoxin (Srx), and thioredoxin (Trx)/thioredoxin disulfide (TrxSS). Each of these redox couples is present in specific concentrations in subcellular and extracellular compartments for each cell type of the human body.

Under physiological condition, cells continuously produce or are exposed to ROS/RNS as byproducts of oxidative phosphorylation (OXPHOS). Leaking of free electron during electron transport results to the production of $O_2^{\cdot-}$. Depending on the level and location, $O_2^{\cdot-}$ will either be scavenged by manganese superoxide dismutase (MnSOD) or interact with NO·. MnSOD prevents the accumulation of damaged products that results from excess $O_2^{\cdot-}$. At the same time, it converts $O_2^{\cdot-}$ to $H_2O_2$, a ROS molecule that serves as a messenger that carries a redox signal from the site of its generation to a target site. On the other hand, $O_2^{\cdot-}$ interacts with NO to form $ONOO^-$, which can then interact with tyrosine to cause protein nitration. Although, the rate constant for the reaction of ·NO with $O_2^{\cdot-}$ to yield $ONOO^-$ [$1.9 \times 10^{10}$ $(mol/L/L)^{-1}s^{-1}$] is more than three times faster than that of the enzymatic dismutation of $O_2^{\cdot-}$ catalyzed by SOD (kSOD=$2 \times 10^9$ $(mol/L)^{-1} \cdot s^{-1}$, however, due to the amount of MnSOD present in the mitochondria, $O_2^{\cdot-}$ is often converted to $H_2O_2$ in the mitochondria. It has been shown that the ratio of $O_2^{\cdot-}$ to $H_2O_2$ determines cell fate. A predominant increase in $O_2^{\cdot-}$ supports cell survival, whereas a tilt in favor of $H_2O_2$ induces cell death signaling.

In addition to cell fate, mitochondrial ROS play a significant role in regulating cellular metabolism, it has been shown that mitochondrial $O_2^{\cdot-}$ and $H_2O_2$ significantly contribute to glucose deprivation-induced cytotoxicity and oxidative stress in prostate cancer PC3 cells.[41] In contrast, mitochondrial catalase and MnSOD can partially inhibit glucose deprivation-induced cytotoxicity. Collectively, the mitochondrial redox state is mainly regulated by OXPHOS, glucose consumption rate (GCR), manganese superoxide dismutase (MnSOD), NADPH/NADP, thioreredoxin 2 couple (Trx2/Trx2SS), and GSH/GSSG.

There is a need in the art for therapies to accelerate repair of mucosal injury to impact treatment of condition impacting intestinal epithelial cells, such as IBD and coronavirus-induced enteritis.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

The presently-disclosed subject matter includes a method of increasing mitochondrial respiration in a cell, which involves contacting the cell with an effective amount of a compound of formula (I) or formula (II) or a pharmaceutically acceptable salt thereof.

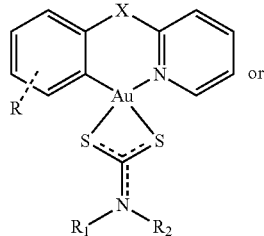

(I)

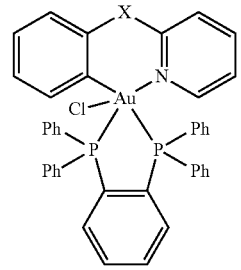

(II)

wherein X is selected from the group consisting of CH, C=O, C=NO-alkynyl, NH, O, S, or aryl; R is selected from the group consisting of H, aryl, alkyl, electron withdrawing group (EWG), or electron donating group (EDG); $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the method, the cell is an intestinal epithelial cell (IECs). In some embodiments, the cell is in a subject. In some embodiments, the subject has been diagnosed with inflammatory bowel disease (IBD). In some embodiments, the subject has been diagnosed with coronavirus induced enteritis. In some embodiments, the subject is a mammal.

In some embodiments of the method, the cell is a cultured cell.

In some embodiments of the method, the effective amount of the compound is between about 0.1 μM and about 10 μM.

The presently-disclosed subject matter includes use of a compound of formula (I) or formula (II) or a pharmaceutically acceptable salt thereof in a medicament for the treatment of inflammatory bowel disease (IBD)

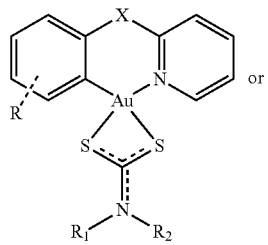

(I)

(II)

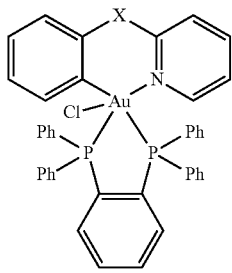

wherein X is selected from the group consisting of CH, C=O, C=NO-alkynyl, NH, O, S, or aryl; R is selected from the group consisting of H, aryl, alkyl, electron withdrawing group (EWG), or electron donating group (EDG); $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

The presently-disclosed subject matter includes use of a compound of formula (I) or formula (II) or a pharmaceutically acceptable salt thereof in a medicament for the treatment of coronavirus induced enteritis (I)

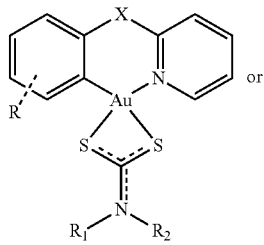

or (II)

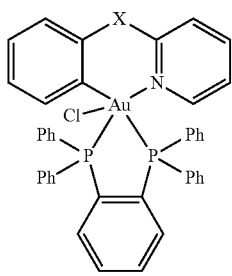

wherein X is selected from the group consisting of CH, C=O, C=NO-alkynyl, NH, O, S, or aryl; R is selected from the group consisting of H, aryl, alkyl, electron withdrawing group (EWG), or electron donating group (EDG); $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the method or use disclosed herein, the compound has the following formula or a pharmaceutically acceptable salt thereof:

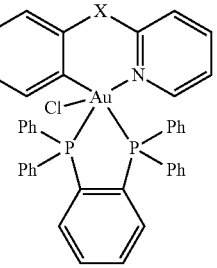

wherein X is C=O or CH.

In some embodiments of the method or use disclosed herein, the compound has the following formula or a pharmaceutically acceptable salt thereof:

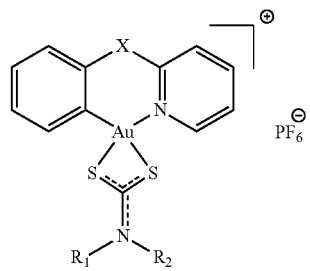

wherein X is selected from the group consisting of CH, C=O, C=NO-alkynyl, NH, O, S, or aryl; $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the method or use disclosed herein, the compound has the following formula or a pharmaceutically acceptable salt thereof:

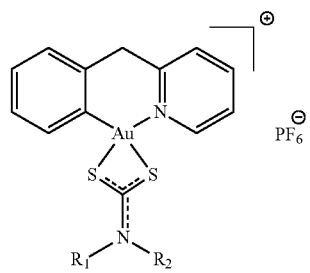

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the method or use disclosed herein, the compound has the following formula or a pharmaceutically acceptable salt thereof:

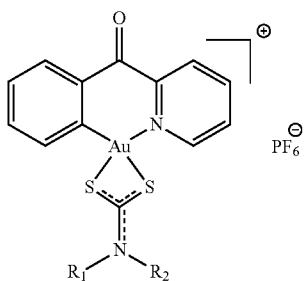

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the method or use disclosed herein, the compound has the following formula or a pharmaceutically acceptable salt thereof:

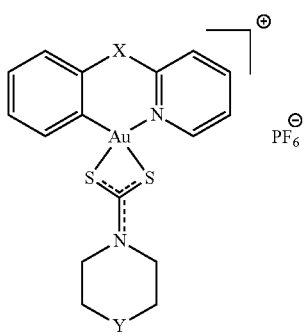

wherein X is selected from the group consisting of CH, C=O, C=NO-alkynyl, NH, O, S, or aryl; and Y is $CH_2$ or NH.

In some embodiments of the method or use disclosed herein, the compound has the following formula or a pharmaceutically acceptable salt thereof:

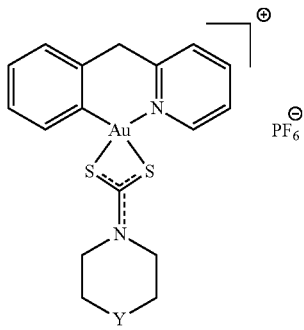

wherein Y is $CH_2$ or NH.

In some embodiments of the method or use disclosed herein, the compound has the following formula or a pharmaceutically acceptable salt thereof:

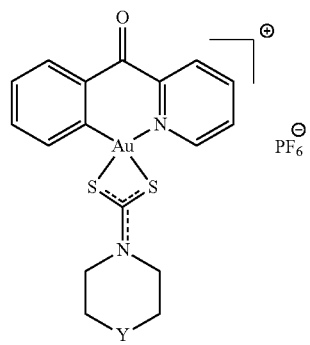

wherein Y is $CH_2$ or NH.

In some embodiments of the method or use disclosed herein, the compound has the following formula or a pharmaceutically acceptable salt thereof:

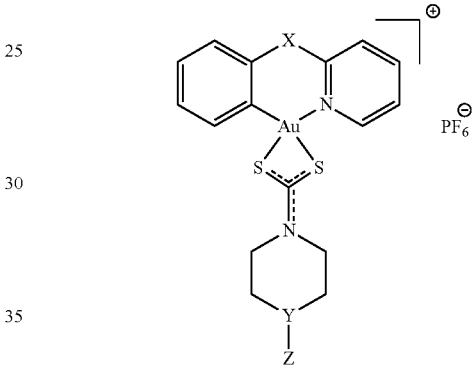

wherein X is selected from the group consisting of CH, C=O, C=NO-alkynyl, NH, O, S, or aryl; Y is CH or N; and Z is haloaryl or alkoxyaryl.

In some embodiments of the method or use disclosed herein, the compound has the following formula or a pharmaceutically acceptable salt thereof:

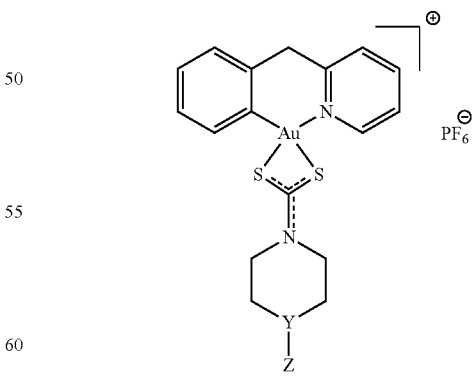

wherein Y is CH or N, and Z is haloaryl or alkoxyaryl.

In some embodiments of the method or use disclosed herein, the compound has the following formula or a pharmaceutically acceptable salt thereof:

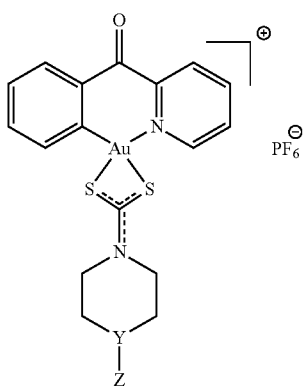

wherein Y is CH or N, and Z is haloaryl or alkoxyaryl.

In some embodiments of the method or use disclosed herein, the compound has the following formula or a pharmaceutically acceptable salt thereof:

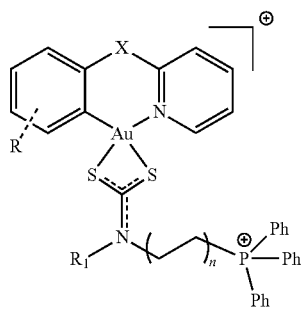

wherein X is selected from the group consisting of CH, C=O, C=NO-alkynyl, NH, O, S, or aryl; R is selected from the group consisting of H, aryl, alkyl, electron withdrawing group (EWG), or electron donating group (EDG); $R_1$ is selected the group consisting of alkyl and substituted alkyl; and n is 2, 4, 6, 8, 10, 12, or 16.

In some embodiments of the method or use disclosed herein, the compound has the following formula or a pharmaceutically acceptable salt thereof:

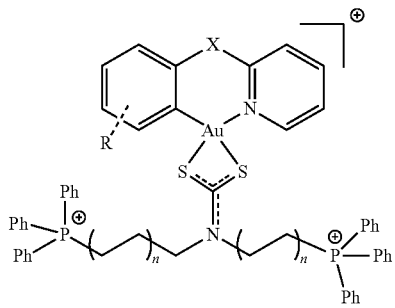

wherein X is selected from the group consisting of CH, C=O, C=NO-alkynyl, NH, O, S, or aryl; R is selected from the group consisting of H, aryl, alkyl, electron withdrawing group (EWG), or electron donating group (EDG); and each n is independently selected from 2, 4, 6, 8, 10, 12, or 16.

In some embodiments of the methods and uses disclosed herein, in the compounds of formula (I) or formula (II), X is selected from the group consisting of C—Y, N—Y, O—Y, or S—Y, where Y is a substituent such as H, =OR$_3$, =NR$_3$, =NOR$_3$, —R$_3$, where R$_3$ is alkyl, aryl, or alkynyl. In some embodiments, X is selected from the group consisting of CH, C=O, C=NO— alkynyl, NH, O, S, or aryl. In some embodiments, X is selected from the group consisting of CH and C=O. In some embodiments, X is aryl, selected from the group consisting of phenyl (Ph), benzyl (Bz), thiophenyl, furyl, and pyridyl. In some embodiments, X is selected from the group consisting of

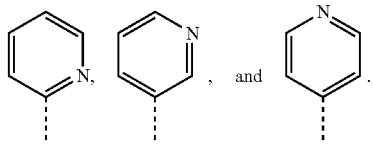

In some embodiments, X is C=NO— alkynyl.

In some embodiments of the methods and uses disclosed herein, in the compounds of formula (I), R is selected from the group consisting of H, aryl, alkyl, electron withdrawing group (EWG), or electron donating group (EDG). In some embodiments, R is in ortho, para, or meta position to Au. In some embodiments, R is aryl, selected from the group consisting of Ph, Bz, thiophenyl, furyl, and pyridyl. In some embodiments, R is alkyl including 1, 2, 3, 4, 5, 6, 7, or 8 carbon atoms. In some embodiments, R is EWG, selected from the group consisting of —CF$_3$, NO$_2$, —F, —Br, —Cl, Aldehyde —COH, —COOH, and —CN. In some embodiments, R is EDG, selected from the group consisting of —OCH$_3$, —OH, CH$_3$, —C≡C, -alkynyl group, and —NH$_2$.

In some embodiments of the methods and uses disclosed herein, in the compounds of formula (I), R$_1$ and R$_2$ are independently selected the group consisting of alkyl and substituted alkyl.

In some embodiments of the methods and uses disclosed herein, in compounds of formula (I), R$_1$ is alkyl including 1-33 carbon atoms. In some embodiments, R$_1$ is

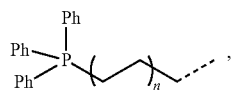

wherein n is 2, 4, 6, 8, 10, 12, or 16. In some embodiments, R$_1$ is selected from the group consisting of methyl and ethyl.

In some embodiments of the methods and uses disclosed herein, in the compounds of formula (I), R$_2$ is alkyl including 1-32 carbon atoms. In some embodiments, R$_2$ is

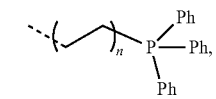

wherein n is 2, 4, 6, 8, 10, 12, or 16. In some embodiments, R$_2$ is selected from the group consisting of methyl and ethyl.

In some embodiments of the methods and uses disclosed herein, in the compounds of formula (I), R$_1$ and R$_2$, taken together with the N to which they are bound, form a piperidine or piperazine that not substituted. In some embodiments, R$_1$ and R$_2$, taken together with the N to which they are bound, form a piperidine or piperazine that is substituted with Z.

In some embodiments of the methods and uses disclosed herein, in the compounds of formula (I), Z is selected from the group consisting of haloaryl and alkoxyaryl.
In some embodiments of the methods and uses disclosed herein, a compound is used that is selected from the following formulae or a pharmaceutically acceptable salt thereof:
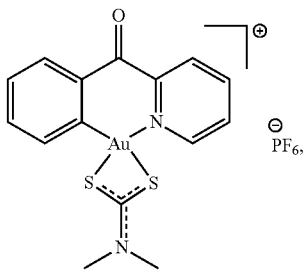
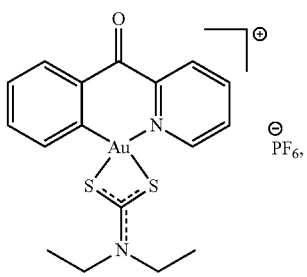
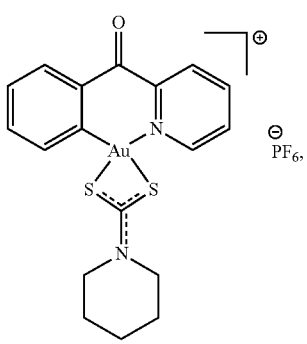
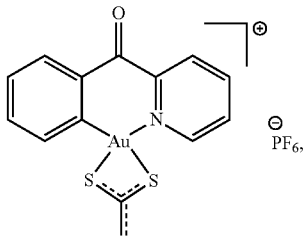
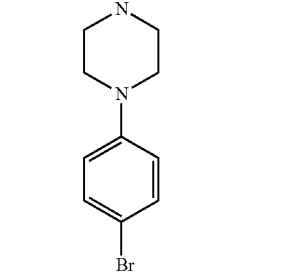
-continued
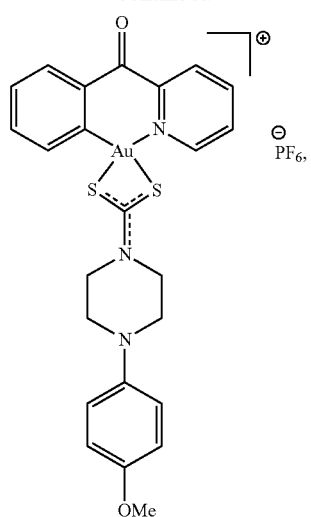
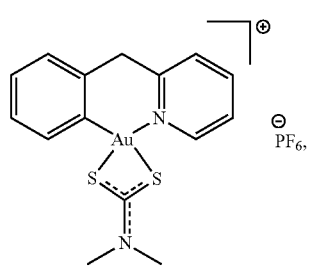
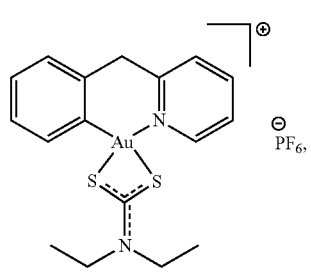
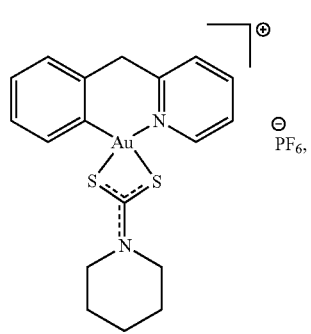

-continued

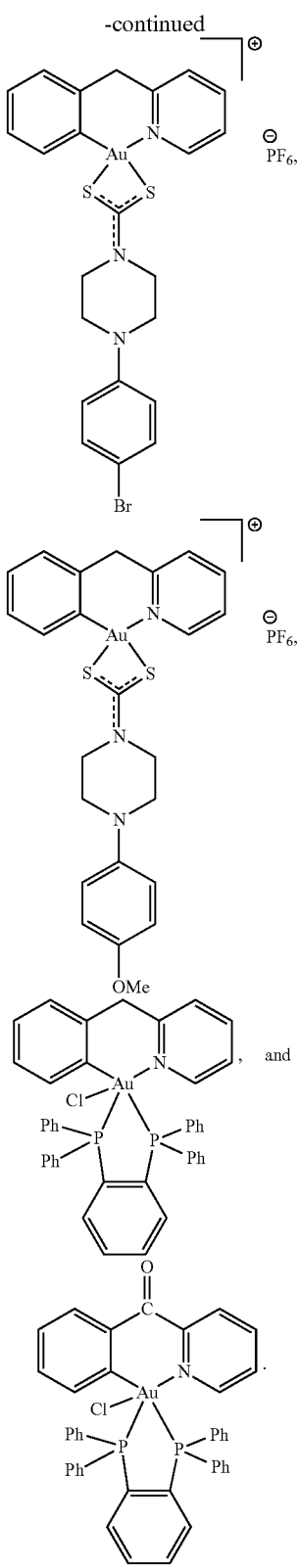

and

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are used, and the accompanying drawings of which.

FIG. 1A shows intestinal epithelial cell (IEC) protein levels of IEC from normal and active colitis patients have increased levels of EMT associated proteins. FIG. 1B shows that RNA levels of EMT-associated genes increase with active colitis and normalize in remission. FIG. 1C includes an image showing that biopsies were taken from the ulcer surface, area adjacent to the ulcer and area distal to the ulcer. FIG. 1D illustrates that there is a pattern of increasing EMT-associated gene expression that positively correlates with proximity to the ulcer.

FIG. 5A includes a schematic representation of Vilin-Cre-mTmG-Tfa$^{mfl/fl}$ genotype in IECs and an agarose gel electrophoresis showing Tfam floxed using primer pair specific to the regions outside exon-6 and -7. FIG. 5B includes a Western blot showing reduced Tfam and mitochondrial complexes (I-V). FIG. 5C include results of quantitative PCR based determination of mt-DNA copy number in flow sorted IECs from Tfam$^{fl/fl}$ mice compared to WT control. FIG. 5D includes a series of images of WT mouse colon with GFP$^+$ cells (i) that has normal levels of COXIVsI (ii) and Tfam$^{fl/fl}$mice at baseline with predominant GFP$^+$ cells (iii) with low expression of COXIVsI (iv). FIG. 5E includes COXIVsI staining quantification conducted using imageJ software.

FIG. 6A includes high-resolution respirometry showing reduced OCR (OxPHOS) in IECs isolated from Tfa$^{mfl/fl}$ mice. FIG. 6B includes an oxygraph displaying reduced oxygen consumption rate in TFAM$^{fl/fl}$ IECs compared to WT IEC using TCA cycle, complex I and II substrates, inhibitors, and ETC uncoupler.

FIG. 7A is an image showing crypt branching at ulcer margins in patient with Crohn's disease. FIG. 7B includes hematoxylin and eosin stain (H&E) section from Crohn's biopsy showing regenerative crypt branching. FIG. 7C depicts fissioning WT (Tom+) crypts (SEE ARROWS) and a non-fissioning TFAM-KO ($^{GFP+}$) crypt. FIG. 7D provides quantification of WT (T$^{om+}$) and Tfam-KO (G$^{FP+}$) fissioning crypts following DSS treatment (days 11-21). FIG. 7E includes percentage of To$^{m+}$ and GF$^{P+}$ crypts during and after DSS treatment. FIG. 7F provides quantification of percent WT (Tom+) cells in WT and Tfam-KO mice at baseline and on Day 13 showing an increase in WT "escapers" during ulcer healing.

FIG. 8A includes a chemical structure of AuPhos. FIG. 8B includes extrapolated AuPhos-induced OCR (complex I) in liver mitochondria. FIG. 8C shows mitochondrial uptake of AuPhos by measuring gold content (graphite furnace atomic absorption spectroscopy) in normal colonocytes (NCM460). FIG. 8D shows mitochondrial uptake of AuPhos by measuring gold content (graphite furnace atomic absorption spectroscopy) in breast cancer (MDA-MB-231). FIG. 8E provides weight change in AuPhos-treated mice over time. FIG. 8F presents stability of AuPhos in PBS and DMEM. FIG. 8G presents stability of AuPhos in PBS and DMEM. FIG. 8H includes an AuPhos-induced Heat map of DEG (left Panel), obtained using log 2(Fold Change) and p-Value <0.00001 thresholds in MDA-MB-231(107) cells (n=2), and the top six hits of KEGG analysis (right panel). FIG. 8I presents biodistribution and pharmacokinetics of AuPhos in different tissues; Colon, Small bowel, Lung, Kidney, Spleen, Liver, Heart and Blood after single dose (oral, 25 mg/kg) administration of AuPhos at 6 h, 12 h and 24 h. FIG. 8J presents biodistribution and pharmacokinetics of AuPhos in different tissues stool after single dose (oral, 25 mg/kg) administration of AuPhos at 6 h, 12 h and 24 h.

FIG. 9A includes results for changes with 2% DSS given for 7 days followed by water. AuPhos was started (25 mg/kg q 3D) on DAY1. Body Wt changes shown as means of each group (n=6) with SEM for 9 and 13 day trials. FIG. 9B includes results for changes with 2% DSS given for 7 days followed by water. AuPhos was started (25 mg/kg q 3D) on DAY1. Body Wt changes shown as means of each group (n=6) with SEM for 9 and 13 day trials as shown, with corresponding DAI. FIG. 9C includes results for changes with 2% DSS given for 7 days followed by water. AuPhos was started (25 mg/kg q 3D) on DAY1. Histological score in DSS-colitis mice 7 and 13 days after DSS initation. Statistical significance was determined using 2-way ANOVA with Sidak's multiple comparison test (A,B) or unpaired t-test (C).

FIG. 10A includes an oxygraph displaying increased OCR (OxPHOS) in IEC from AuPhos (25 mg/kg; q3D; 3 doses)-fed mice compared to controls (vehicle only) using TCA cycle, complex I and II substrates, inhibitors, and ETC uncoupler. FIG. 10B includes high resolution respirometry results showing OCR in mitochondrial complexes of IECs from (A). FIG. 10C includes a bar graph showing higher mtDNA/nucDNA ratio in IECs isolated from AuPhos-treated DSS mice. FIG. 10D provides results of RT-qPCR analysis of genes associated with mitochondrial respiratory enzymes in AuPhos vs. control DSS mice. Stats—2-way ANOVA with Sidak's multiple comparison test. ★★<0.01, ★★★<0.0001.

FIG. 11A includes representative images showing AuPhos-induced (200 nM) mtROS (superoxide) production using MitoSOX Red assay. FIG. 11B (Rotenome (1 mM) and PEG-SOD (750 U) were used as positive and negative controls, respectively. FIG. 11C AuPhos (200 nM) treatment Increases $H_2O_2$ production in human colonoid monolayer cultures as measured by AmplexRed. Statistical significance was determined using 1-way ANOVA with multiple comparison test. ★<0.05; ★★<0.01; ★★★<0.001. FIG. 11D AuPhos (200 nM) treatment Increases $H_2O_2$ production in human colonoid monolayer cultures as measured by AmplexRed. Statistical significance was determined using 1-way ANOVA with multiple comparison test. ★<0.05; ★★<0.01; ★★★<0.001.

FIG. 12A RT-qPCR analysis of cytokines and chemokine genes in AuPhos vs. controls at 9 and 13 days after DSS initiation. FIG. 12B RT-qPCR analysis of cytokines and chemokine genes in AuPhos vs. controls at 9 and 13 days after DSS initiation. FIG. 12C Quantitative RT-PCR analysis of inflammasome markers in D13 DSS mice. Statistical significance was determined using multiple t-test with Holm-Sidak's multiple method. FIG. 12D Serum IL-6 in AuPhos treated (n=4) and control mice, with or without anti-CD3 antibody. ★<0.05; ★★<0.01.

FIG. 13A Histological scoring and % severity of piroxicam (Px)-accelerated IL10 KO colitis in a 56-day study. FIG. 13B Representative images showing H&E staining of colon section at day—0 (DO) and day—14 & —28 (after Px).

FIG. 14A Normal human colonic biopsies were incubated a$^{t\ 4o}$ C. with AuPhos×3 hrs and membrane fractions examined for mitochondrial complexes expression by WB. FIG. 14B TNF-stimulated colonic NCM460 cells were treated overnight with AuPhos at concentrations indicated. WB for markers indicated are shown in nuclear and membranous protein fractions. FIG. 14C Markers of PI3K pathway were probed in nuclear and cytosolic fractions of AuPhos-treated NCM460 cells (treated with TNF). FIG. 14D NCM460 cell were treated overnight with TNF and probed for the ROS-induced P-PTEN, which inactivates PTEN and activates PI3K.

FIG. 16A. Biodistribution and pharmacokinetics of AuPhos in different tissues; Colon, Small bowel, Spleen, Liver after a single intragastric (i.g.) gavage (25 mg/kg) with measurements of AuPhos tissue levels (graphite furnace atomic absorption spectroscopy) at times indicated. FIG. 16B. Mitochondrial uptake of AuPhos by measuring gold content in mitochondrial fractions in normal colonocytes (NCM460). FIG. 16C. High-resolution respirometry showing OCR in mitochondrial complexes of freshly isolated IECs from AuPhos (25 mg/kg; q3D×3 doses)-fed mice compared to controls (vehicle only). Stats—2-way ANOVA with Sidak's multiple comparison test. ß<0.05, ßß<0.01. FIG. 16D. Control or DSS colitis mice were gavaged with vehicle (−) or AuPhos (+) (as in FIG. 2) and sacrificed on D14. WB of isolated IEC proteins indicated are shown in nuclear and membranous protein fractions along with densitometry. (#mice=4 for each condition). *p<0.04. FIG. 16E. Normal human colonic biopsies were incubated at 4° C. with AuPhos×3 hrs. Membranous and nuclear fractions examined for indicated proteins by WB.

FIG. 17A. Body Wt changes shown as means of each group (n=6) with SEM for 15 day trial as shown, with FIG. 17B. corresponding DAI. FIG. 17C. Histological score in DSS-colitis mice after Day-7, -11, -13, and -15 of DSS initiation. Statistical significance was determined using 2-way ANOVA with Sidak's multiple comparison test (A,B) or unpaired t-test (C) FIG. 17D. Representative images of H&E staining of whole tissue scan from 13-day study. E. Effect of AuPhos on intestinal permeability using FITC-dextran in DSS-colitis mice (n=5) in a separate D7, D9, D11, D13 and D15 experiment. F. RT-qPCR analysis of cytokines and chemokines genes in AuPhos vs. vehicle treated DSS colitis mice from 9-day, 13-day and 15-day studies. ß<0.05, ßß<0.01, ßßß<0.0001.

DESCRIPTION OF EXEMPLARY EMBODIMENTS

Figure 1A:
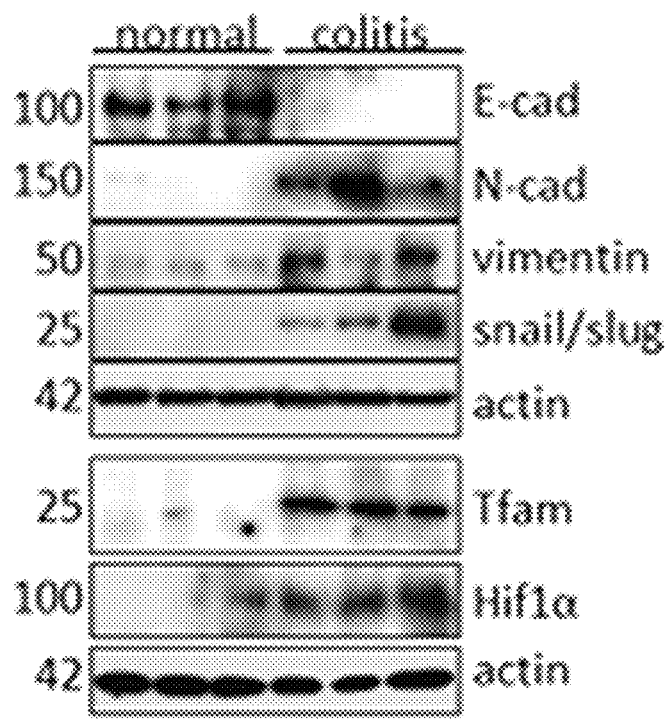
FIGS. 1A-1D illustrate that epithelial-tomesenchymal transition (EMT) is activated in human colitis.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which need to be independently confirmed.

In some embodiments, the presently-disclosed subject matter relates to methods and uses of compounds and compositions for increasing mitochondrial respiration in a cell. In some embodiments, the methods and uses of compounds and compositions have utility in the treatment of inflammatory bowel disease (IBD). In some embodiments, the methods and uses of compounds and compositions have utility in the treatment of coronavirus induced enteritis.

In some embodiments, the presently-disclosed subject matter includes a method of increasing mitochondrial respiration in a cell, comprising contacting the cell with an effective amount of a compound of formula (I) or formula (II) or a pharmaceutically acceptable salt thereof:

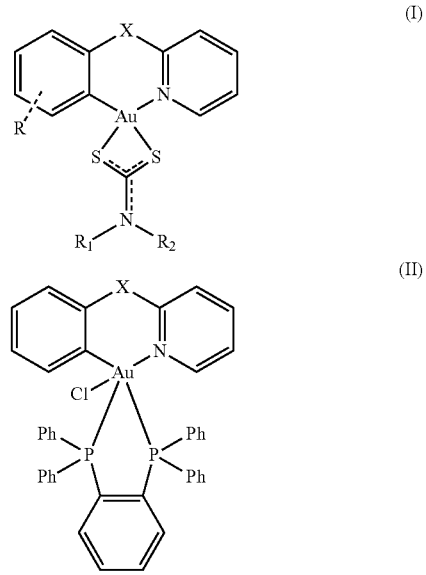

The compounds described herein for use in the presently-disclosed methods and uses can include all salt forms, for example, salts of both basic groups, inter alia, amines, as well as salts of acidic groups, inter alia, carboxylic acids. The following are non-limiting examples of anions that can form salts with protonated basic groups: chloride, bromide, iodide, sulfate, bisulfate, carbonate, bicarbonate, phosphate, formate, acetate, propionate, butyrate, pyruvate, lactate, oxalate, malonate, maleate, succinate, tartrate, fumarate, citrate, and the like. The following are non-limiting examples of cations that can form salts of acidic groups: ammonium, sodium, lithium, potassium, calcium, magnesium, bismuth, lysine, and the like.

The analogs (compounds) described herein are arranged into several categories to assist the formulator in applying a rational synthetic strategy for the preparation of analogs which are not expressly exampled herein. The arrangement into categories does not imply increased or decreased efficacy for any of the compositions of matter described herein.

In some embodiments of the methods and uses disclosed herein, in the compounds of formula (I) or formula (II), X is selected from the group consisting of C—Y, N—Y, O—Y, or S—Y, where Y is a substituent such as H, =$OR_3$, =$NR_3$, =$NOR_3$, —$R_3$, where $R_3$ is alkyl, aryl, or alkynyl. In some embodiments, X is selected from the group consisting of CH, C=O, C=NO— alkynyl, NH, O, S, or aryl. In some embodiments, X is selected from the group consisting of CH and C=O. In some embodiments, X is aryl, selected from the group consisting of phenyl (Ph), benzyl (Bz), thiophenyl, furyl, and pyridyl. In some embodiments, X is selected from the group consisting of

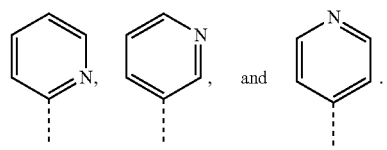

In some embodiments, X is C=NO— alkynyl.

In some embodiments of the methods and uses disclosed herein, in the compounds of formula (I), R is selected from the group consisting of H, aryl, alkyl, electron withdrawing group (EWG), or electron donating group (EDG). In some embodiments, R is in ortho, para, or meta position to Au. In some embodiments, R is aryl, selected from the group consisting of Ph, Bz, thiophenyl, furyl, and pyridyl. In some embodiments, R is alkyl including 1, 2, 3, 4, 5, 6, 7, or 8 carbon atoms. In some embodiments, R is EWG, selected from the group consisting of —$CF_3$, $NO_2$, —F, —Br, —Cl, Aldehyde —COH, —COOH, and —CN. In some embodiments, R is EDG, selected from the group consisting of —$OCH_3$, —OH, $CH_3$, —C≡C, -alkynyl group, and —$NH_2$.

In some embodiments of the methods and uses disclosed herein, in the compounds of formula (I), $R_1$ and $R_2$ are independently selected the group consisting of alkyl and substituted alkyl.

In some embodiments of the methods and uses disclosed herein, in compounds of formula (I), $R_1$ is alkyl including 1-33 carbon atoms. In some embodiments, $R_1$ is

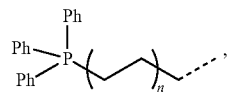

wherein n is 2, 4, 6, 8, 10, 12, or 16. In some embodiments, $R_1$ is selected from the group consisting of methyl and ethyl.

In some embodiments of the methods and uses disclosed herein, in the compounds of formula (I), $R_2$ is alkyl including 1-32 carbon atoms. In some embodiments, $R_2$ is

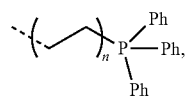

wherein n is 2, 4, 6, 8, 10, 12, or 16. In some embodiments, $R_2$ is selected from the group consisting of methyl and ethyl.

In some embodiments of the methods and uses disclosed herein, in the compounds of formula (I), $R_1$ and $R_2$, taken together with the N to which they are bound, form a piperidine or piperazine that not substituted. In some embodiments, $R_1$ and $R_2$, taken together with the N to which they are bound, form a piperidine or piperazine that is substituted with Z.

In some embodiments of the methods and uses disclosed herein, in the compounds of formula (I), Z is selected from the group consisting of haloaryl and alkoxyaryl.

In some embodiments of the methods and uses disclosed herein, a compound is used having the following formula or a pharmaceutically acceptable salt thereof:

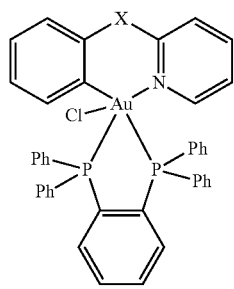

(II)

wherein X is C=O or CH.

In some embodiments of the methods and uses disclosed herein, a compound is used having the following formula or a pharmaceutically acceptable salt thereof:

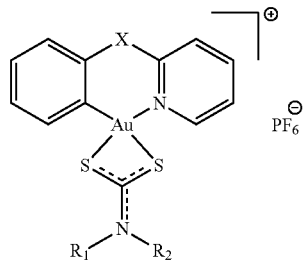

wherein X is selected from the group consisting of CH, C=O, C=NO-alkynyl, NH, O, S, or aryl; $R_1$ and $R_2$ are independently selected the group consisting of alkyl and substituted alkyl, or $R_1$ and $R_2$, taken together with the N to which they are bound, form a piperidine or piperazine that is optionally substituted with Z; and Z is selected from the group consisting of haloaryl and alkoxyaryl.

In some embodiments of the methods and uses disclosed herein, a compound is used having the following formula or a pharmaceutically acceptable salt thereof:

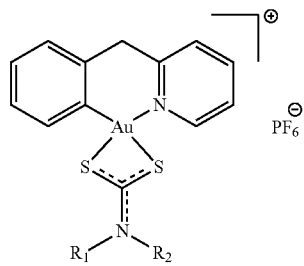

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the methods and uses disclosed herein, a compound is used having the following formula or a pharmaceutically acceptable salt thereof:

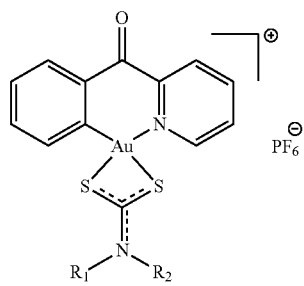

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the methods and uses disclosed herein, a compound is used having the following formula or a pharmaceutically acceptable salt thereof:

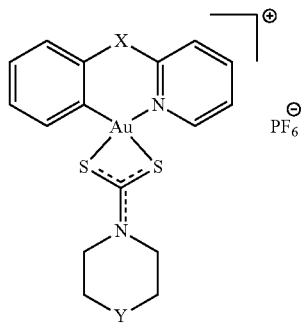

wherein X is selected from the group consisting of CH, C=O, C=NO-alkynyl, NH, O, S, or aryl; and Y is CH₂ or NH.

In some embodiments of the methods and uses disclosed herein, a compound is used having the following formula or a pharmaceutically acceptable salt thereof:

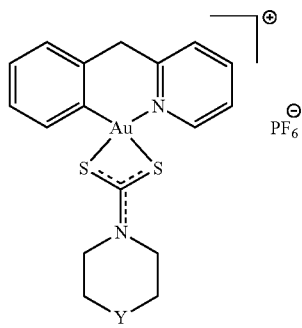

wherein Y is CH₂ or NH.

In some embodiments of the methods and uses disclosed herein, a compound is used having the following formula or a pharmaceutically acceptable salt thereof:

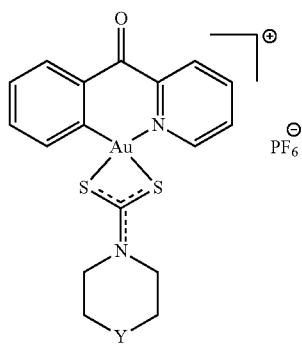

wherein Y is CH₂ or NH.

In some embodiments of the methods and uses disclosed herein, a compound is used having the following formula or a pharmaceutically acceptable salt thereof:

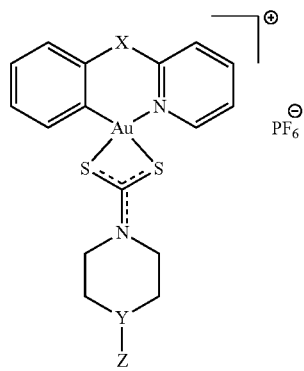

wherein X is selected from the group consisting of CH, C=O, C=NO-alkynyl, NH, O, S, or aryl; Y is CH or N; and Z is haloaryl or alkoxyaryl.

In some embodiments of the methods and uses disclosed herein, a compound is used having the following formula or a pharmaceutically acceptable salt thereof:

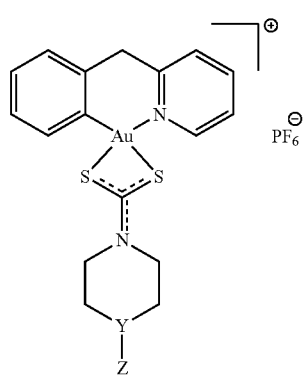

wherein Y is CH or N, and Z is haloaryl or alkoxyaryl.

In some embodiments of the methods and uses disclosed herein, a compound is used having the following formula or a pharmaceutically acceptable salt thereof:

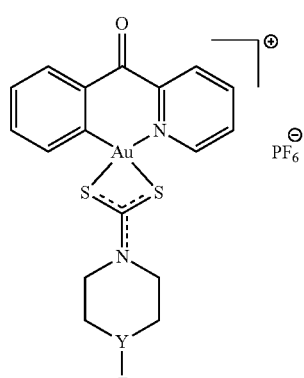

wherein Y is CH or N, and Z is haloaryl or alkoxyaryl.

In some embodiments of the methods and uses disclosed herein, a compound is used having the following formula or a pharmaceutically acceptable salt thereof:

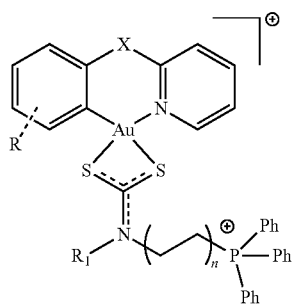

wherein X is selected from the group consisting of CH, C=O, C=NO-alkynyl, NH, O, S, or aryl R is selected from the group consisting of H, aryl, alkyl, electron withdrawing group (EWG), or electron donating group (EDG); $R_1$ is selected the group consisting of alkyl and substituted alkyl; and n is 2, 4, 6, 8, 10, 12, or 16.

In some embodiments of the methods and uses disclosed herein, a compound is used having the following formula or a pharmaceutically acceptable salt thereof.

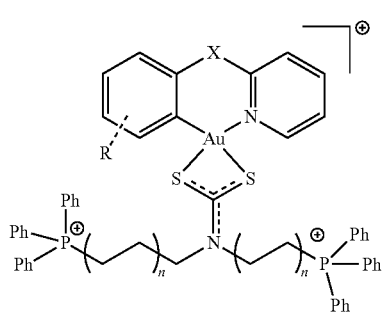

wherein X is selected from the group consisting of CH, C=O, C=NO-alkynyl, NH, O, S, or aryl; R is selected from the group consisting of H, aryl, alkyl, electron withdrawing group (EWG), or electron donating group (EDG); and each n is independently selected from 2, 4, 6, 8, 10, 12, or 16.

In some embodiments of the methods and uses disclosed herein, a compound is used that is selected from the following formulae or a pharmaceutically acceptable salt thereof:

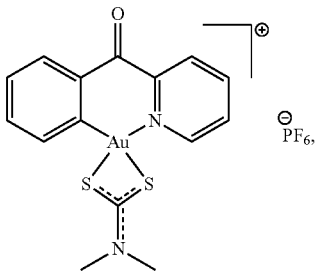

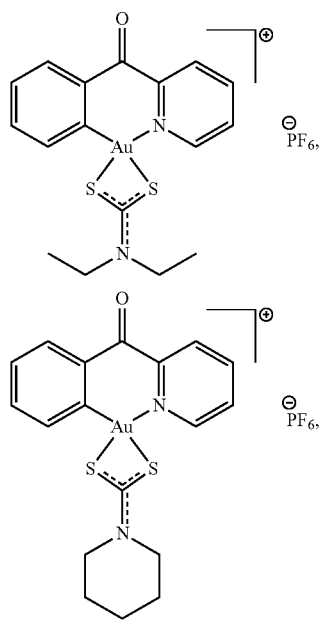

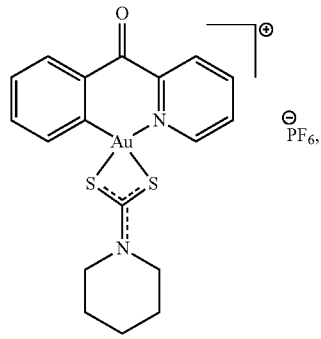

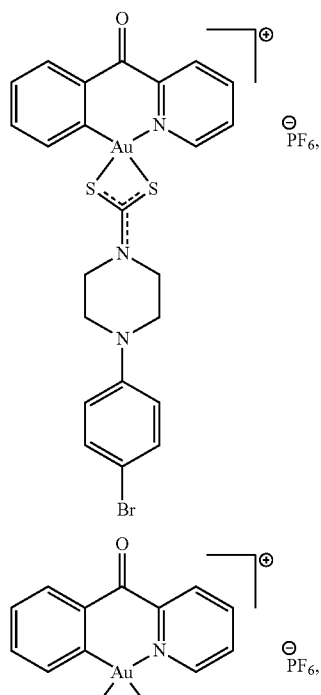

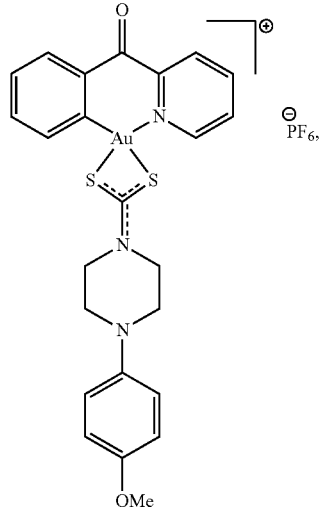

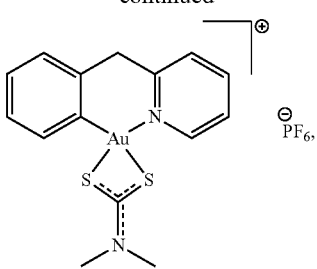

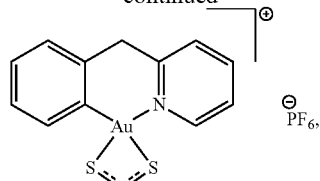

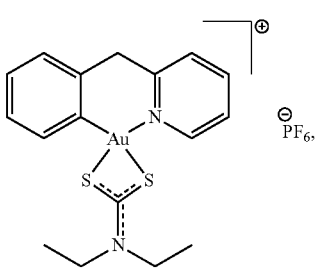

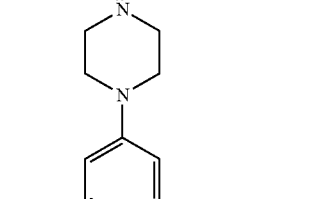

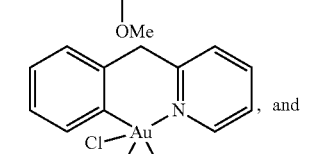

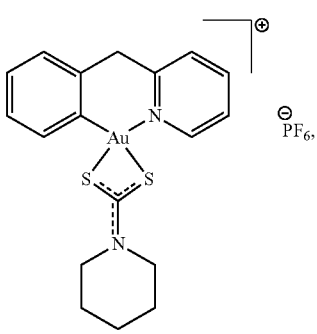

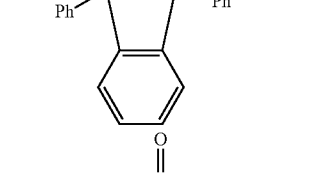

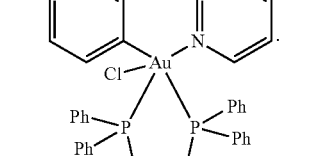

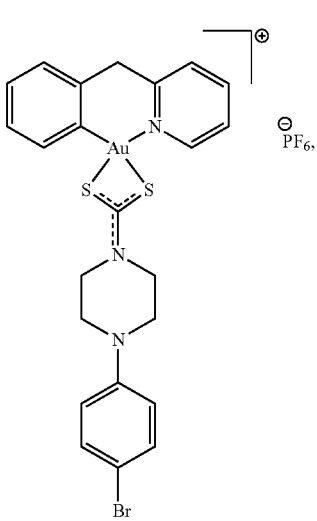

In some embodiments, the presently-disclosed subject matter is related to a method or use that makes use of a pharmaceutical composition comprising one or more compounds as disclosed herein and a pharmaceutically-acceptable carrier.

Some embodiments of the methods and uses disclosed herein related to increasing mitochondrial respiration in a cell. In some embodiments, the cell is an intestinal epithelial cell (IECs).

In some embodiments of the methods and uses disclosed herein, the cell is in a subject. In some embodiments, the subject has been diagnosed with a need for treatment of a disease state associated with intestinal mucosal injury. In some embodiments, the subject has been diagnosed with a need for intestinal mucosal repair. In some embodiments, the subject has been diagnosed with inflammatory bowel disease (IBD). In some embodiments, the subject has been diagnosed with coronavirus induced enteritis. In some embodiments, the subject is a mammal.

In some embodiments of the methods and uses disclosed herein, the cell is a cultured cell.

In some embodiments of the methods and uses disclosed herein, the effective amount of the compound is between about 0.1 µM and about 10 µM.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "A$^1$," "A$^2$," "A$^3$," and "A$^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, optionally substituted alkyl, cycloalkyl, alkoxy, amino, ether, halide, hydroxy, nitro, silyl, sulfo-oxo, or thiol as described herein.

The term "polyalkylene group" as used herein is a group having two or more CH$_2$ groups linked to one another. The polyalkylene group can be represented by a formula —(CH$_2$)$_a$—, where "a" is an integer of from 2 to 500.

The terms "alkoxy" and "alkoxyl" as used herein to refer to an alkyl or cycloalkyl group bonded through an ether linkage; that is, an "alkoxy" group can be defined as —OA$^1$ where A$^1$ is alkyl or cycloalkyl as defined above. "Alkoxy" also includes polymers of alkoxy groups as just described; that is, an alkoxy can be a polyether such as —OA$^1$-OA$^2$ or —OA$^1$-(OA$^2$)$_a$-OA$^3$, where "a" is an integer of from 1 to 200 and A$^1$, A$^2$, and A$^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as (A$^1$A$^2$)C=C(A$^3$A$^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by a formula —C(O)H. Throughout this specification "C(O)" is a short hand notation for a carbonyl group, i.e., C=O.

The terms "amine" or "amino" as used herein are represented by a formula $NA^1A^2A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein.

The term "carboxylic acid" as used herein is represented by a formula —C(O)OH.

The term "ester" as used herein is represented by a formula —OC(O)$A^1$ or —C(O)O$A^1$, where $A^1$ can be an optionally substituted alkyl, cycloalkyl, alkenyl, cycloalkenyl, alkynyl, cycloalkynyl, aryl, or heteroaryl group as described herein. The term "polyester" as used herein is represented by a formula—($A^1$O(O)C-$A^2$-C(O)O)$_a$— or -($A^1$O(O)C-$A^2$-OC(O))$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by a formula $A^1OA^2$, where A1 and $A^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by a formula—($A^1$O-$A^2$O)$_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle," as used herein refers to single and multi-cyclic aromatic or non-aromatic ring systems in which at least one of the ring members is other than carbon. Heterocycle includes pyridinde, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "hydroxyl" as used herein is represented by a formula —OH.

The term "ketone" as used herein is represented by a formula $A^1$C(O)$A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by a formula —N₃.

The term "nitro" as used herein is represented by a formula —NO₂.

The term "nitrile" as used herein is represented by a formula —CN.

The term "silyl" as used herein is represented by a formula —SiA¹A²A³, where A¹, A², and A³ can be, independently, hydrogen or an optionally substituted alkyl, cycloalkyl, alkoxy, alkenyl, cycloalkenyl, alkynyl, cycloalkynyl, aryl, or heteroaryl group as described herein.

The term "sulfo-oxo" as used herein is represented by a formulas —S(O)A¹, —S(O)₂A¹, —OS(O)₂A¹, or —OS(O)₂OA¹, where A¹ can be hydrogen or an optionally substituted alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by a formula —S(O)₂A¹, where A¹ can be hydrogen or an optionally substituted alkyl, cycloalkyl, alkenyl, cycloalkenyl, alkynyl, cycloalkynyl, aryl, or heteroaryl group as described herein.

The term "sulfone" as used herein is represented by a formula A¹S(O)₂A², where A¹ and A² can be, independently, an optionally substituted alkyl, cycloalkyl, alkenyl, cycloalkenyl, alkynyl, cycloalkynyl, aryl, or heteroaryl group as described herein. The term "sulfoxide" as used herein is represented by a formula A¹S(O)A², where A¹ and A² can be, independently, an optionally substituted alkyl, cycloalkyl, alkenyl, cycloalkenyl, alkynyl, cycloalkynyl, aryl, or heteroaryl group as described herein.

The term "thiol" as used herein is represented by a formula —SH.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

As used herein, the term "derivative" refers to a compound having a structure derived from the structure of a parent compound (e.g., a compounds disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers. Additionally, unless expressly described as "unsubstituted", all substituents can be substituted or unsubstituted.

In some aspects, a structure of a compound can be represented by a formula:

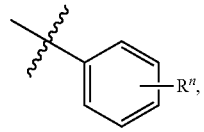

which is understood to be equivalent to a formula:

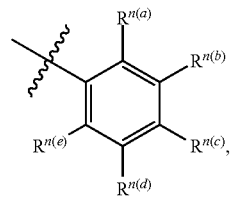

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance. Likewise, when a group R is defined as four substituents, R is understood to represent four independent substituents, $R^a$, $R^b$, $R^c$, and $R^d$. Unless indicated to the contrary, the substituents are not limited to any particular order or arrangement.

The following abbreviations are used herein. DMSO: dimethylsulfoxide. MeOH: methanol. EtOH: ethanol. TFA: trifluoroacetic acid. MeCN: acetonitrile.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the term "subject" includes both human and animal subjects. In some embodiments, the subject is a mammal. In some embodiments, the subject is a human.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein. For example, "diagnosed with a disorder that creates intestinal mucosal injury" means having been subjected to a physical examination by a person of skill, for example, a physician, and found to have a condition that can be diagnosed or treated by a compound or composition that can promote healing of intestinal mucosal injury. Such a diagnosis can be in reference to a disorder, such as IBD or COVID induced enteritis, and the like, as discussed herein.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition.

As used herein, the term "effective amount" refers to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various aspects, a preparation can be administered in a "prophylactically effective amount"; that is, an amount effective for prevention of a disease or condition.

As used herein, the term "pharmaceutically acceptable carrier" refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions which are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose. Desirably, at least 95% by weight of the particles of the active ingredient have an effective particle size in the range of 0.01 to 10 micrometers.

The term "pharmaceutically acceptable" describes a material that is not biologically or otherwise undesirable, i.e., without causing an unacceptable level of undesirable biological effects or interacting in a deleterious manner.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, in some embodiments ±0.1%, in some embodiments ±0.01%, and in some embodiments ±0.001% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

Although any methods, devices, and materials similar or equivalent to those described herein can be used in the practice or testing of the presently-disclosed subject matter, representative methods, devices, and materials are described herein.

EXAMPLES

The presently-disclosed subject matter is further illustrated by the following specific but non-limiting examples. The following examples may include compilations of data that are representative of data gathered at various times during the course of development and experimentation related to the present invention.

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases commercially available, or can be prepared according to literature procedures or as illustrated herein.

Example 1. Synthesis

The [C^N]-cyclometalated gold(III) compounds were synthesized from previously reported methods.[97] Treatment of [C^N]—Au(III)Cl$_2$ with dithiocarbamate ligands in methanol for 16 h at room temperature followed by treatment with an aqueous saturated solution of NH$_4$PF$_6$ gave the desired compounds in respectable yields (Scheme 1).

Scheme 1. Synthetic scheme to generate cyclometalated (C^N) gold (III) complexes bearing dithiocarbamate ligands.

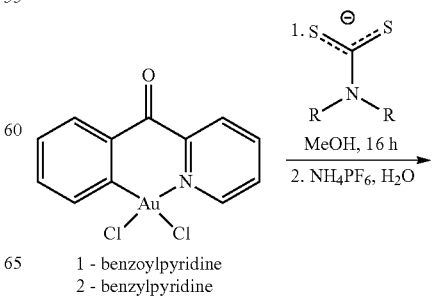

1 - benzoylpyridine
2 - benzylpyridine

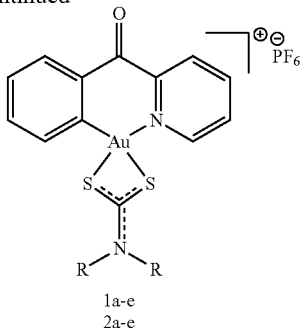

1a-e
2a-e

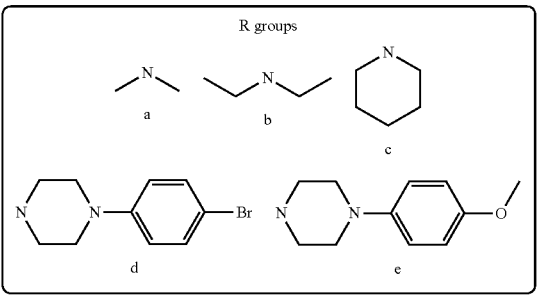

All reactions were carried under ambient conditions in air unless otherwise noted. Solvents were of ACS grade (Pharmco-Aaper) and used as is. The starting Au(III) cyclometalated complexes; [2-benzylpyridine]Au(III)Cl$_2$ and [2-benzoylpyridine]Au(III)Cl$_2$ were prepared according to a modified procedure as previously reported.[1] Sodium dimethyl dithiocarbamate and sodium diethyl dithiocarbamate salts were purchased from Alfa Aesar. 1-(4-bromophenyl)piperazine and 1-(4-Methoxyphenyl)piperazine were purchased from Sigma Aldrich. Ammomium hexafluorophosphate was purchased from Matrix Scientific. Carbon disulfide was purchased from Millipore Sigma and distilled prior to use. Sodium hydroxide pellets were purchased from VWR. Deuterated solvents were purchased from Cambridge Isotope Laboratories (Andover, MA). 3-(4,5-dimethylthiazol-2-yl)-2,5-diphenyltetrazolium bromide (MTT) and 2′,7′-dichlorofluorescin diacetate (DCF-DA), and JC-1 were purchased from Cayman Chemicals. NMR spectra were recorded on a Bruker Avance NEO 400 MHz spectrometer and samples calibrated for: $^1$H NMR (CD$_3$CN δ=1.94 ppm and DMSO-d$_6$ δ=2.50 ppm), $^{13}$C NMR (CD$_3$CN δ=118.26 and 1.32 ppm and DMSO-d$_6$ δ=49.00 ppm), and $^{19}$F NMR externally referenced to CFCl$_3$ δ=0.00). Electrospray ionization mass spectrometry (ESI-MS) was performed on an Agilent Technologies 1100 series liquid chromatography/MS instrument. High-resolution mass spectra (HRMS) were obtained by direct flow injection (injection volume=2 μL) using ElectroSpray Ionization (ESI) on a Waters Qtof API US instrument in the positive mode (CIC, Boston University). Typical conditions are as follows: capillary=3000 kV, cone=35 or 15, source temperature=120° C., and a desolvation temperature=350° C. In addition to spectroscopic characterization, the purity of all compounds was assessed by RP-HPLC using an Agilent Technologies 1100 series HPLC instrument and an Agilent Phase Eclipse Plus C18 column (4.6 mm×100 mm; 3.5 μm particle size). All compounds were found to be 97% pure.

Figure 1B:
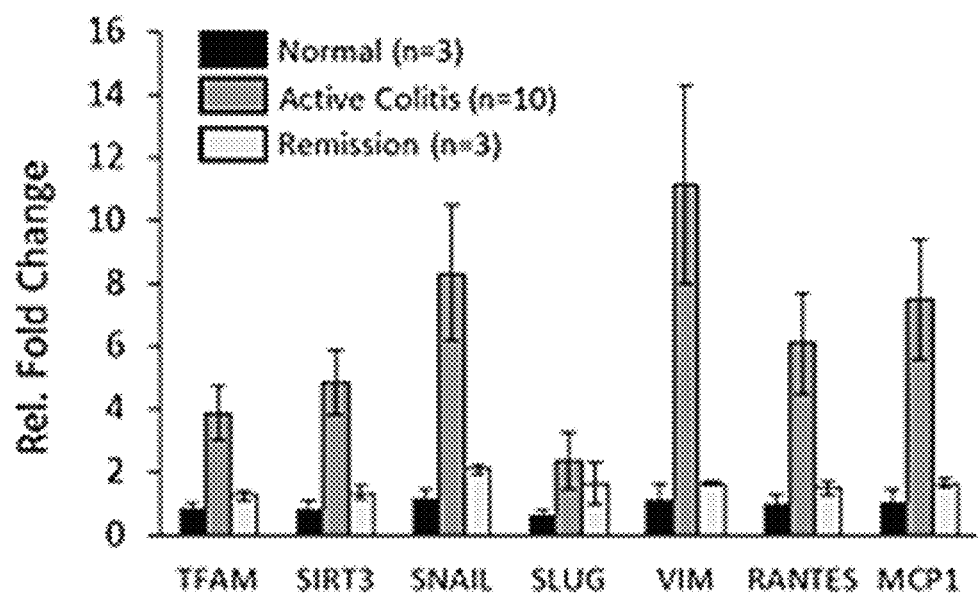

Example 2. Mitochondrial Respiration is Required for Epithelial Reprogramming in Ulcer Healing Data disclosed herein demonstrate a requirement for mitochondrial respiration in epithelial-tomesenchymal transition (EMT) and cellular reprogramming during ulcer healing. There is an unexpected role for Axin2+ IEC in EMT, which is likely to be required for the initial stages of physiological ulcer healing. Colon tissue from patients with active colitis exhibits increased EMT-associated proteins (Snail/Slug, Vimentin and N-cadherin) (FIG. 1A) and a corresponding increase in RNA levels that is abrogated by remission (FIG. 1B).

Figure 1C:
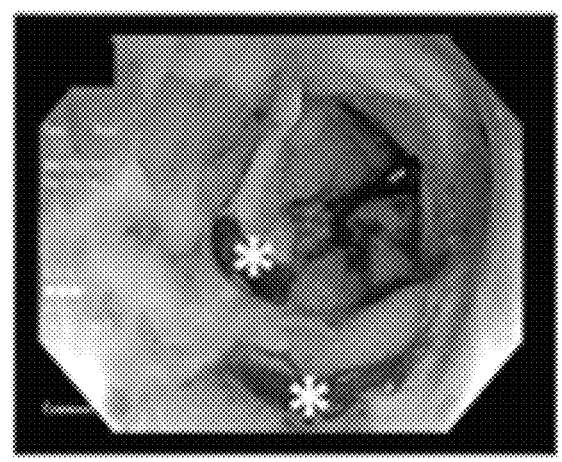
Figure 1D:
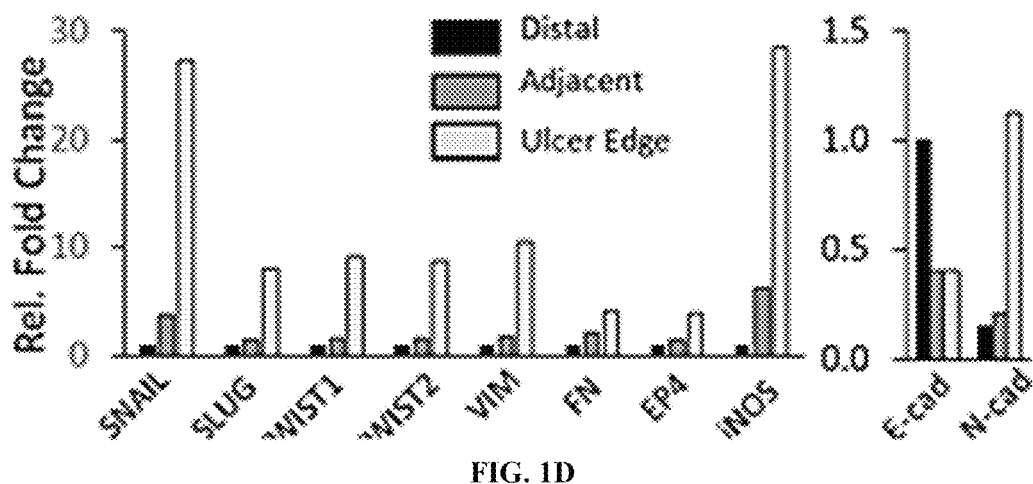
Figure 2:
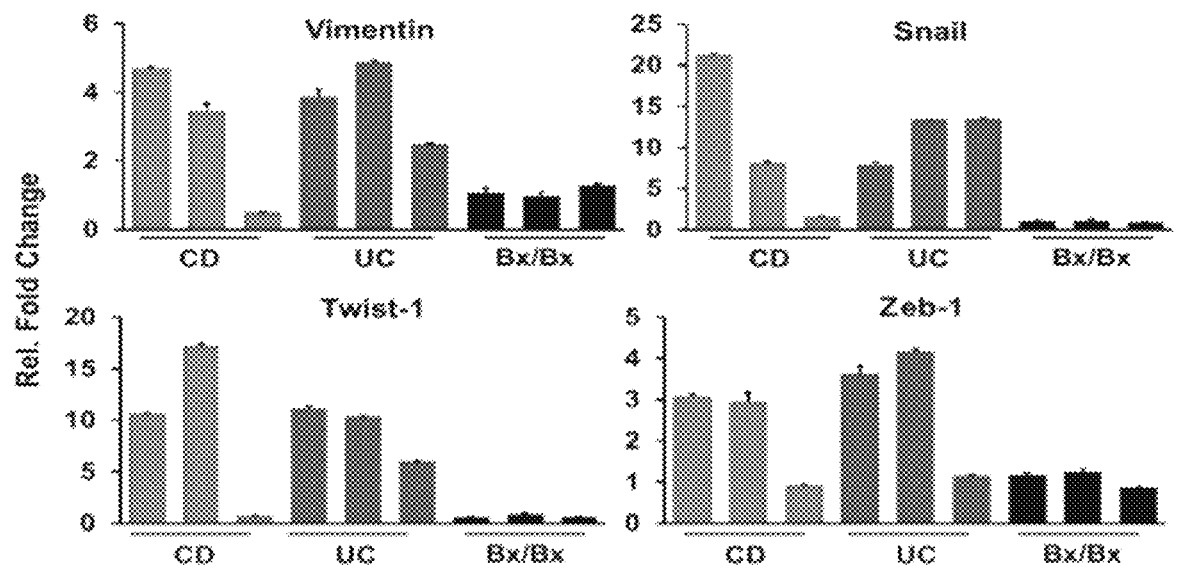
FIG. 2 illustrates that healing in inflammatory bowel disease (IBD) engages EMT, and includes results of gene expression analysis from ulcer margins in patients with Crohn's disease (CD) or ulcerative colitis (UC), or healthy patients with healing biopsy sites, revealing that the EMT gene signature is prevalent in colitis.

To identify the anatomic location of the EMT, ulcer edges, tissue adjacent to the ulcer, and inflamed tissue distant from the ulcer were biopsied. These data revealed a pattern of increasing EMT associated gene expression that positively correlated with proximity to the ulcer (FIG. 1C). Because ulcer healing in colitis occurs in the context of a complex pathophysiological environment, a model of human "wound healing" was developed (described in the current invention) by taking biopsies of previously biopsied sites during the healing process (Bx/Bx). This allows us to interrogate differences in ulcer healing between IBD patients and wound healing in healthy patients. Preliminary data from this procedure revealed that EMT is largely a function of inflammatory ulcer healing rather than wound healing, and is not the dominant healing mechanism in uninflamed individuals (FIG. 2).

Figure 3:
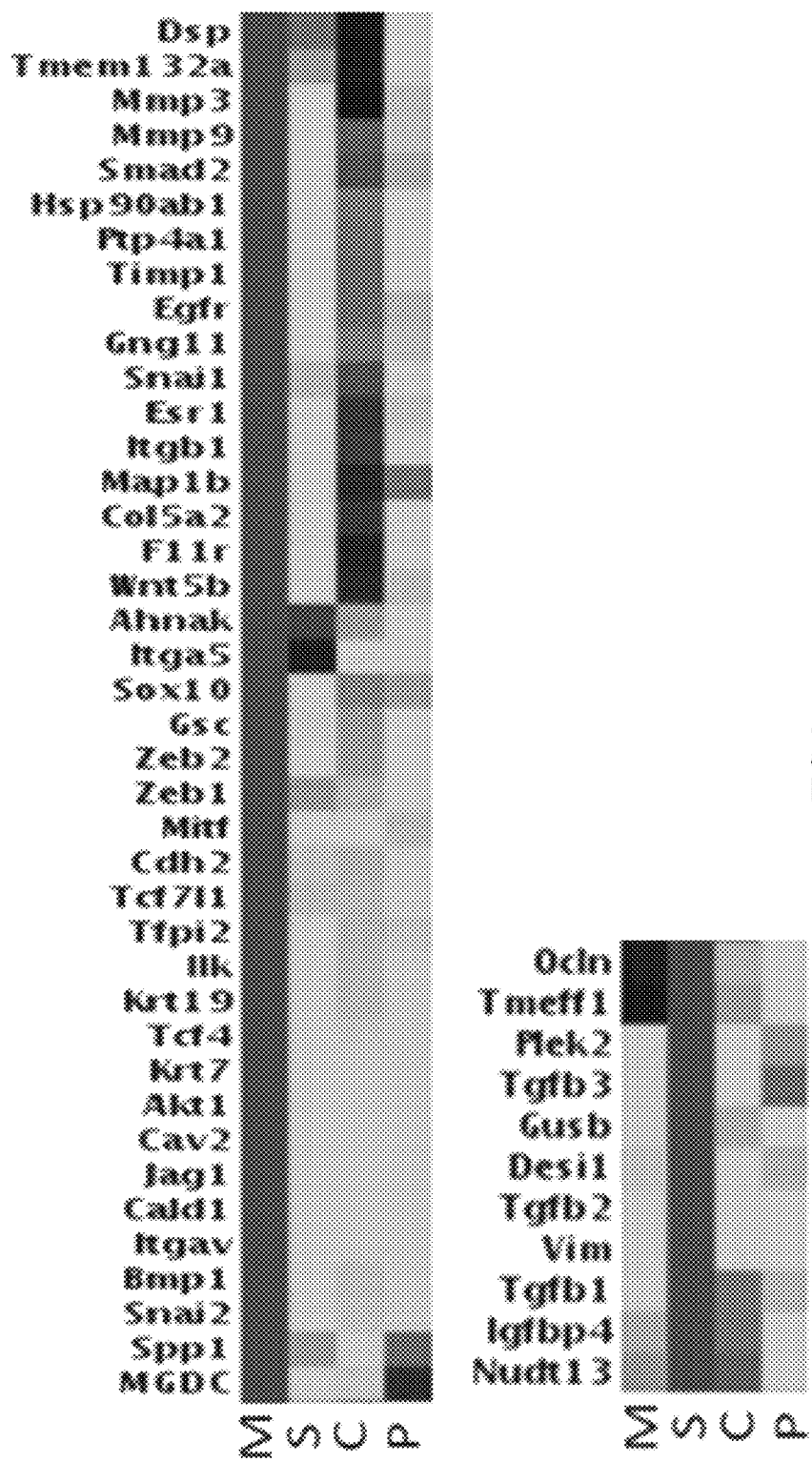
FIG. 3 shows that ulcer margins and surfaces express EMT and TGFB associated genes. The array provides expression levels of laser capture microdissection (LCM) of ulcer margins (M), ulcer surfaces (S), normal crypt bases (C), and colon plateau (P).

To further demonstrate the presence of EMT, laser capture microdissection (LCM) of histology sections from colitic mice was used and performed PCR arrays. A comparison of the epithelial cells from the ulcer margins, ulcer surface, normal crypt base and normal surface plateau revealed a profound increase in the expression of EMT-associated genes in the ulcer margins and TGFB (also known to drive EMT and reprogramming) across the ulcer surface (FIG. 3). These data provide compelling evidence that EMT is active in ulcer restitution.

Figure 4:
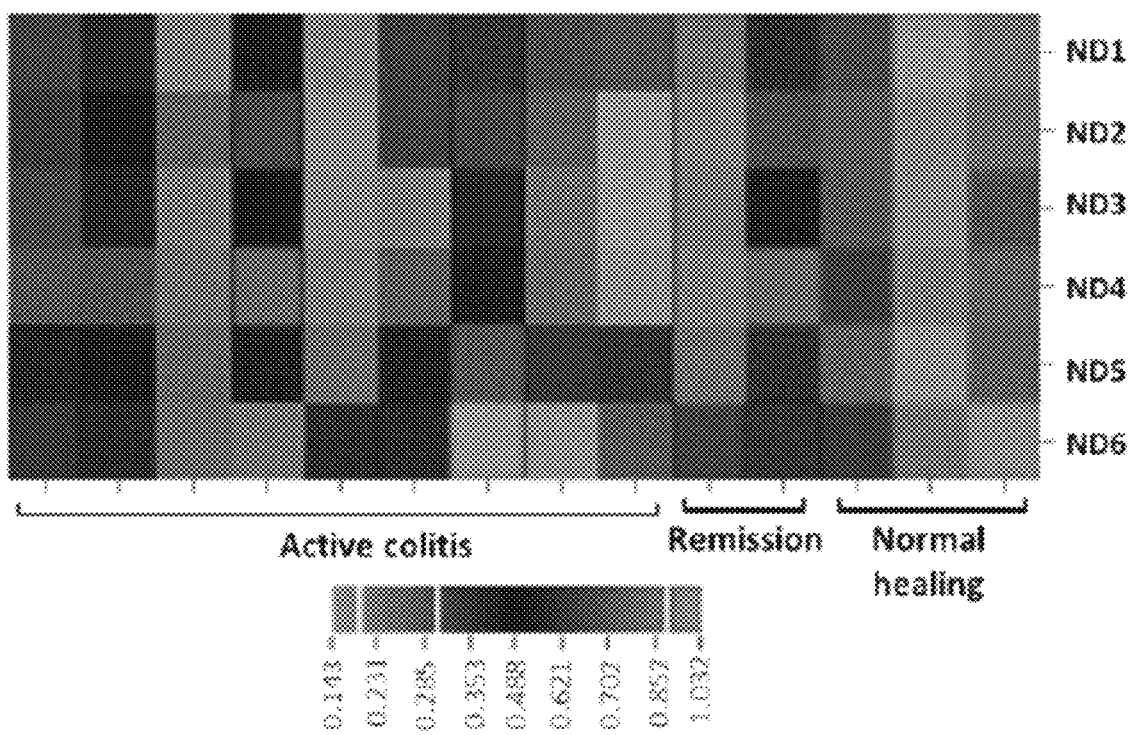
FIG. 4 includes heat map of expression data. RNAseq of from isolated IEC reveals down-regulation of genes encoding mitochondrial complexes in active colitis compared to normal and remission patients.

Because EMT is known to be a downstream product of mitochondrial retrograde signaling (mitochondrial dysfunction and hypoxia signaling) in cancer, mitochondrial function in colitis patients was characterized. Colonic epithelial cells from patients with active colitis have reduced mitochondrial DNA copy number (used as a proxy for mitochondrial mass) and reduced protein levels of mitochondrial complexes. RNAseq data comparing IEC isolated from patients with active colitis, in remission, and healthy patients (Bx/Bx) confirmed a down-regulation of genes associated with mitochondrial respiration (FIG. 4).

Example 3. The Requirement for Mitochondrial Respiration in IBD Ulcer Healing

Figure 5A:
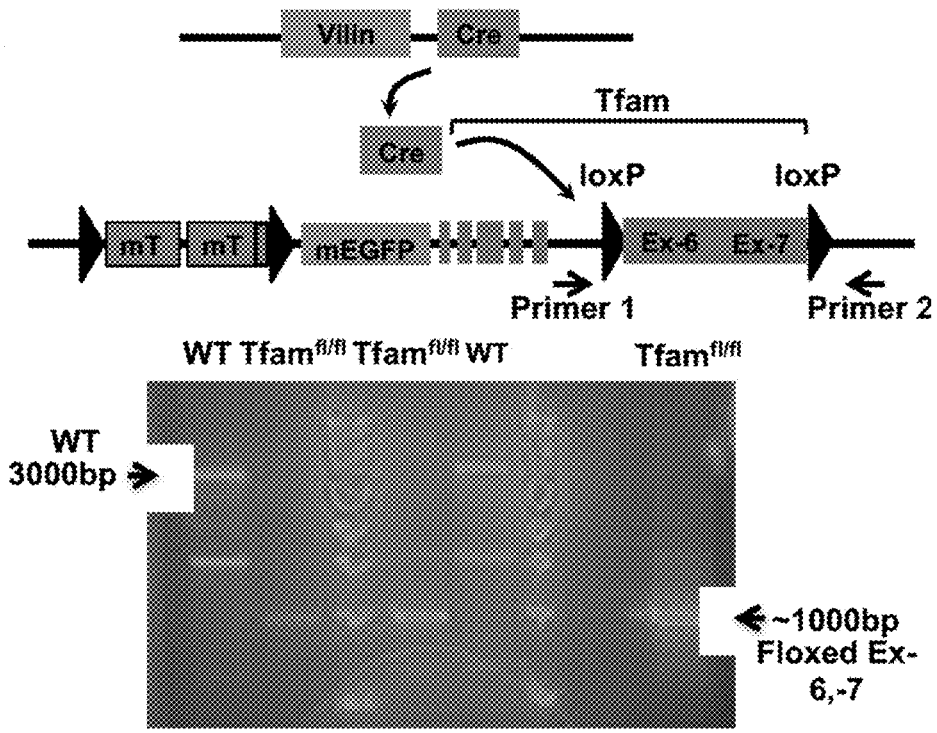
FIGS. 5A-5E show that there is reduced mitochondrial function in IEC TFAM KO mice.
Figure 5B:
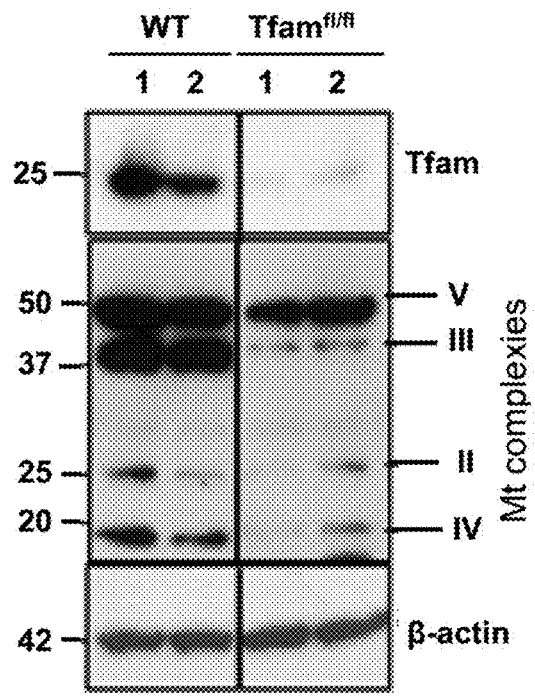
Figure 5C:
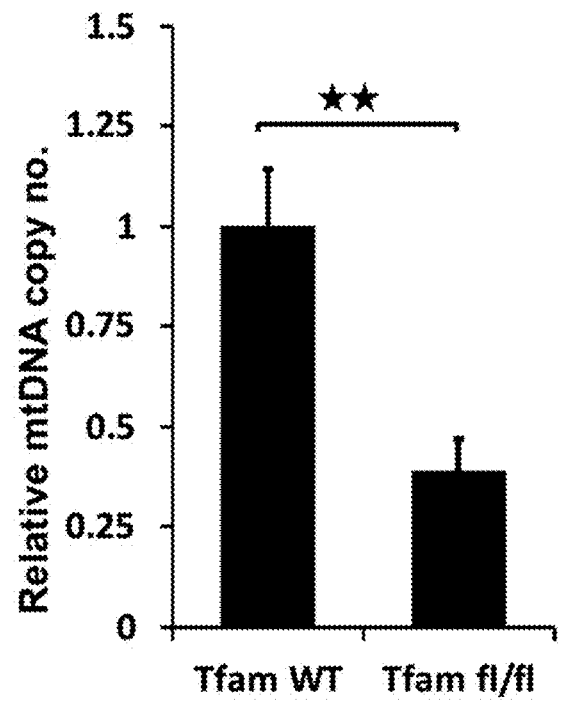
Figure 5D:
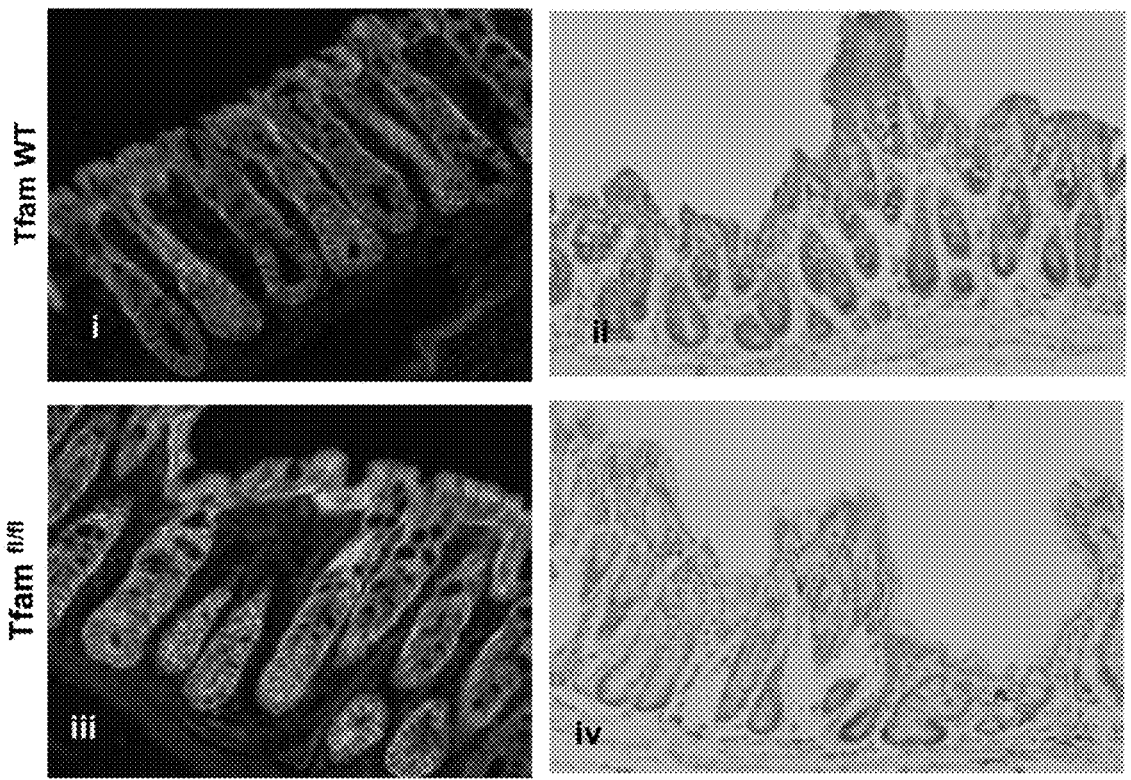
Figure 5E:
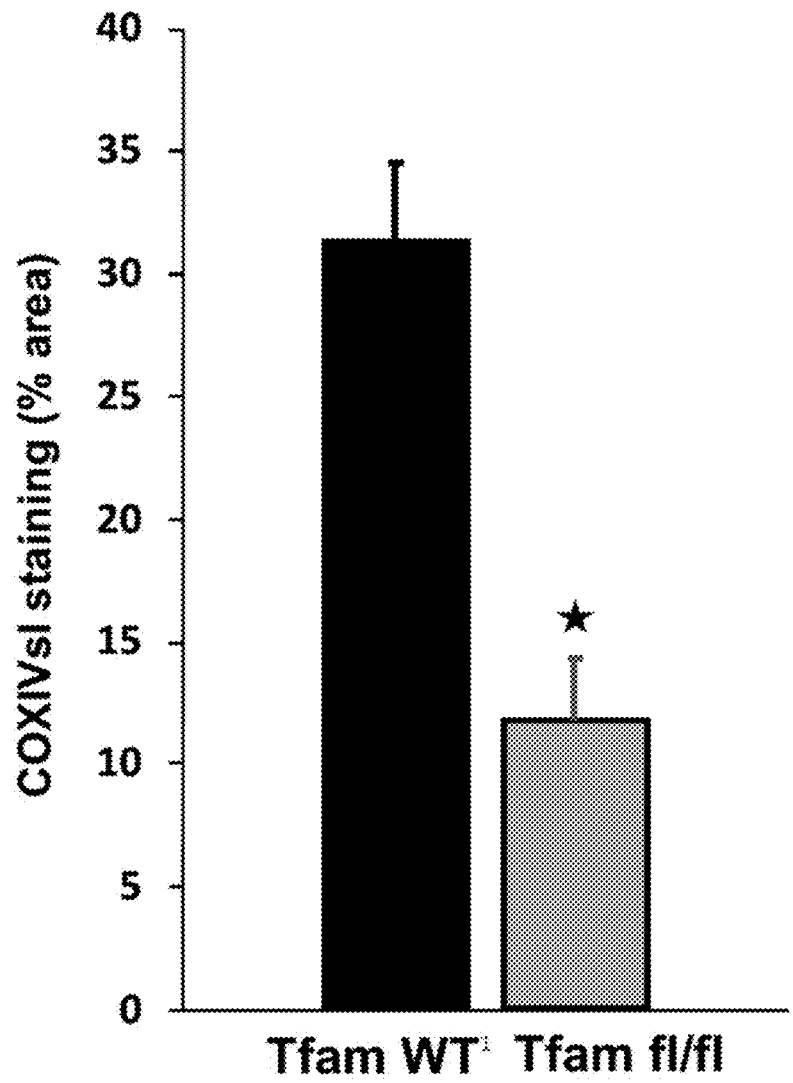
Figure 6A:
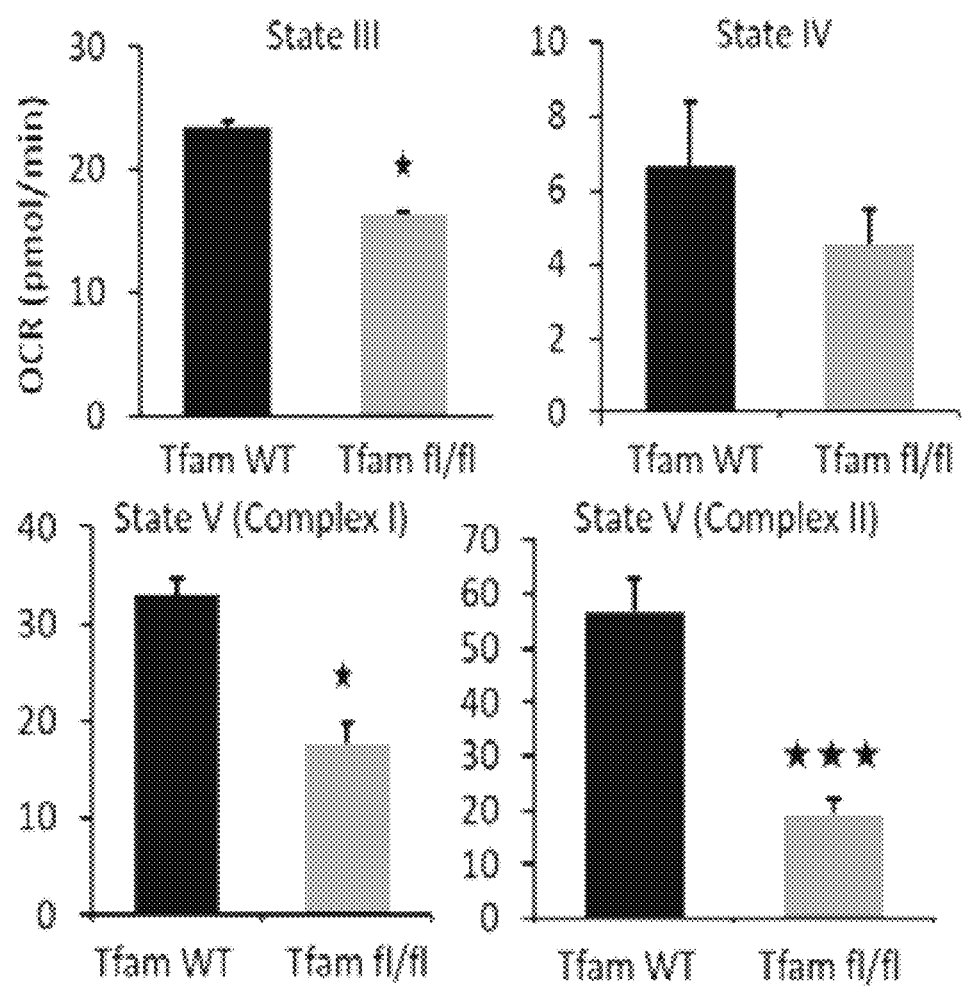
FIGS. 6A and 6B shows that there is reduced OCR in TFAM-deficient IEC.
Figure 6B:
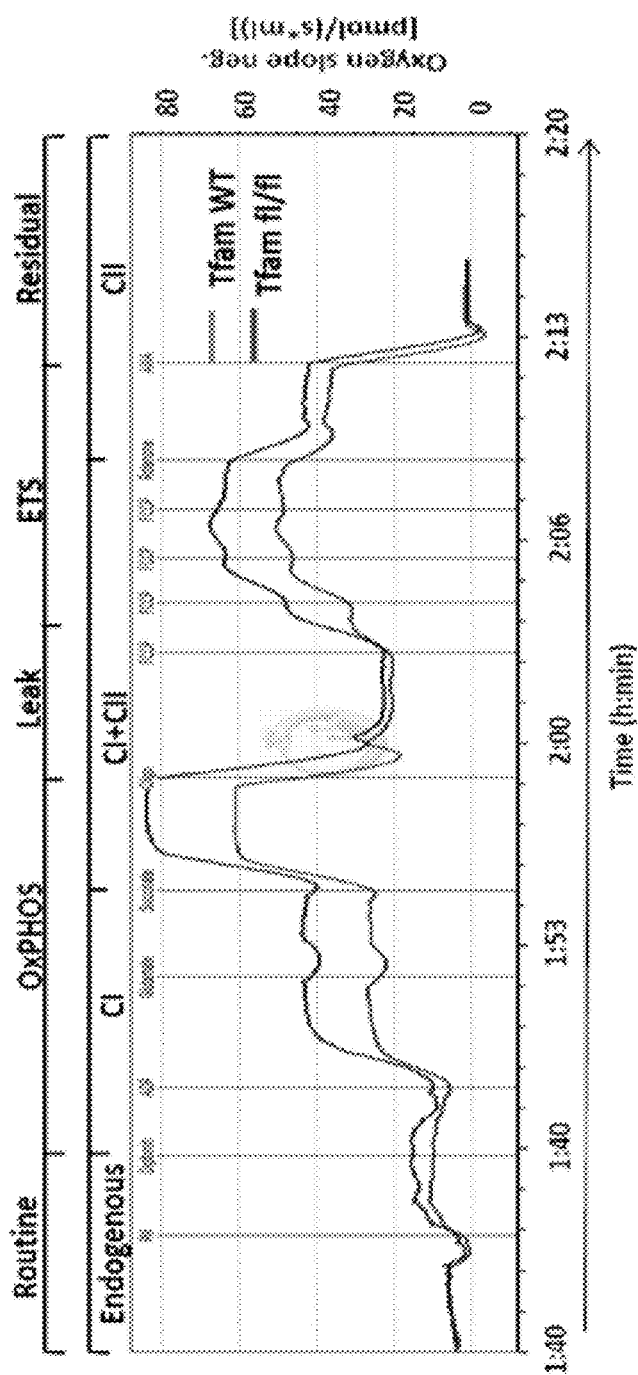

To investigate the role of mitochondrial respiration in ulcer healing in IBD, mice with IEC-deficient mitochondrial respiration were generated (FIG. 2A). This strain was bred to mice with ROSAmTmG, a cell membrane-targeted two color fluorescent Cre-reporter allele, thus producing VilCre/TFAM$^{fl/fl}$mTmG (IEC/TFAM KO) mice. TFAM was selected as it is required for transcription of mitochondrial complexes and has been used in multiple organ systems to interrogate the role of mitochondrial respiration in biologic responses. This novel mouse strain allows tracking of mitochondria-deficient (GFP$^+$) and WT (Tom$^+$) IEC during DSS-colitis time course. In FIG. 5A, IEC sorted for GFP$^+$ express the TFAM with "floxed .exon-6 and -7". Isolated IEC from TFAM KO mice exhibit reduced protein levels of mitochondrial complexes (FIG. 5B) with >50% reduction in mtDNA (FIG. 5C). These data correlate with IHC (FIG. 5D, E) showing reduced staining for COX-IV in GFP$^+$ (TFAM KO) IEC compared to WT. More importantly, when oxygen consumption rates (OCR) of isolated TOM+ (WT) and GFP$^+$ (TFAM KO) IECs were analyzed, GFP$^+$ (TFAM KO) IEC exhibit reduced OCR throughout all stages of mitochondrial respiration (FIG. 6A). Specifically, GFP$^+$ (TFAM KO) IEC exhibited reduced OCR related to mitochondrial complexes throughout phases I through V (FIG. 6B). Furthermore, GFP$^+$ (TFAM KO) IEC also fail to produce equivalent levels of reactive oxygen species (ROS) in response to TNF stimulation compared to WT IEC. Together these data indicate that GFP$^+$ IEC from IEC/TFAM KO mice are deficient in mitochondrial respiration and may model the suppression of IEC mitochondrial function seen in IBD patients.

Example 4. IEC/TFAM KO IEC Fail to Undergo Crypt Fissioning Achieved by WT IEC During Ulcer Healing Given the validation that GFP$^+$ IEC were deficient in mitochondrial respiration, intestinal crypt architecture in unperturbed mice was next examined. Crypt architecture was largely unaffected except for occasional mucin-filled epithelial cysts. However, when IEC/TFAM KO mice were subjected to DSS-induced injury, a delay in ulcer healing was observed. Analysis of the epithelial response to ulcer healing in these mice revealed that early proliferative responses were equivalent in WT (Tom$^+$) and TFAM KO (GFP$^+$) IEC.

Figure 7A:
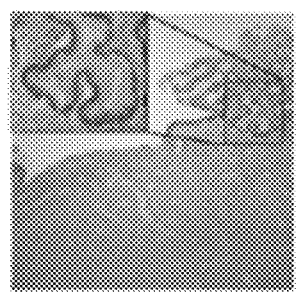
FIGS. 7A-7F illustrates that mitochondrial respiration is required for crypt fissioning.
Figure 7B:
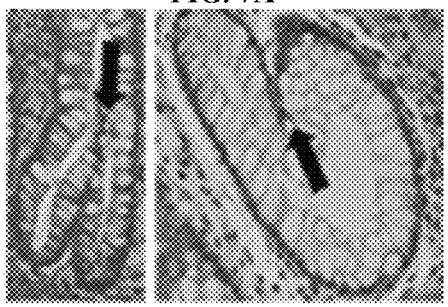
Figure 7C:
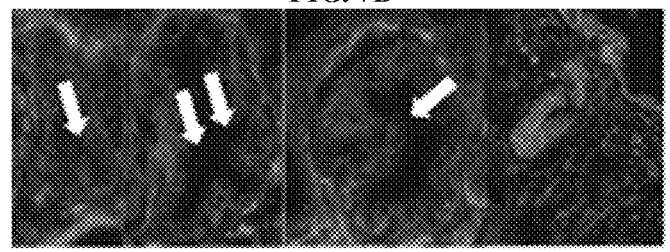
Figure 7D:
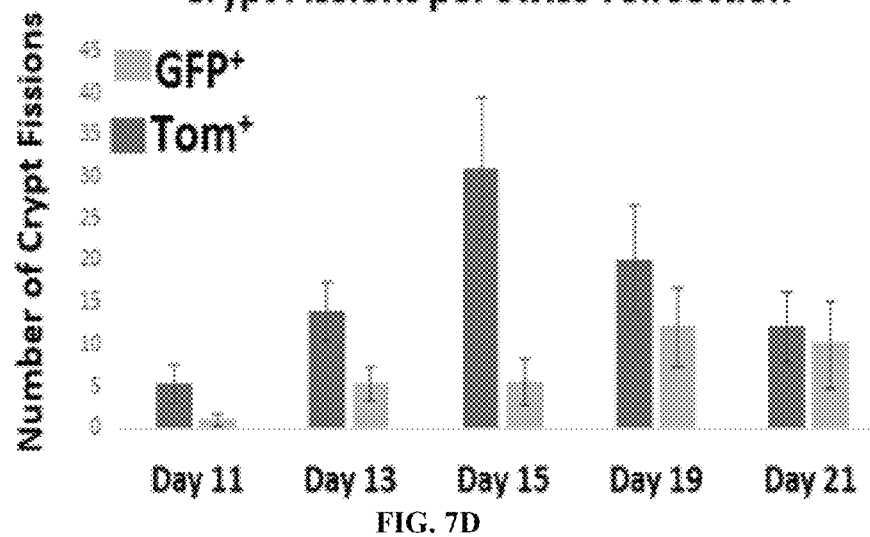
Figure 7E:
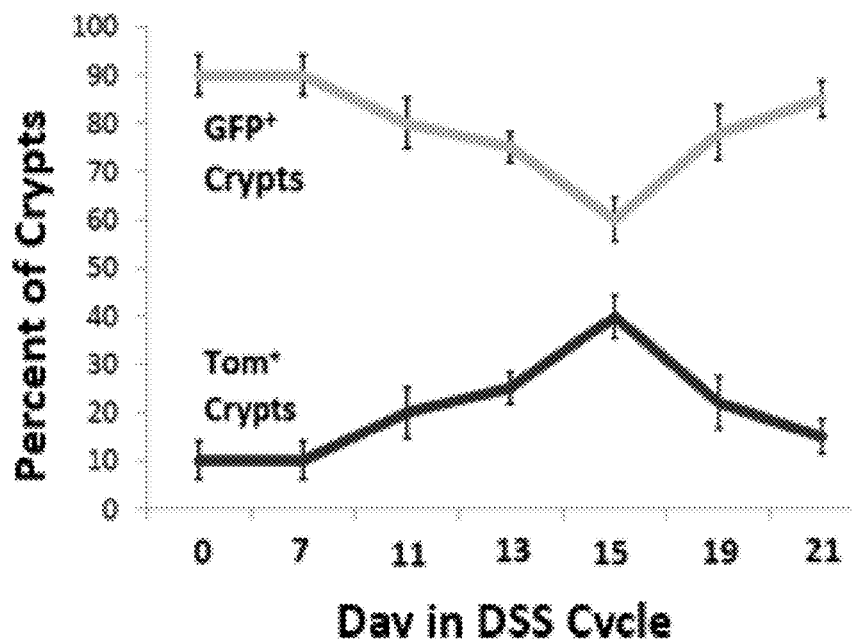
Figure 7F:
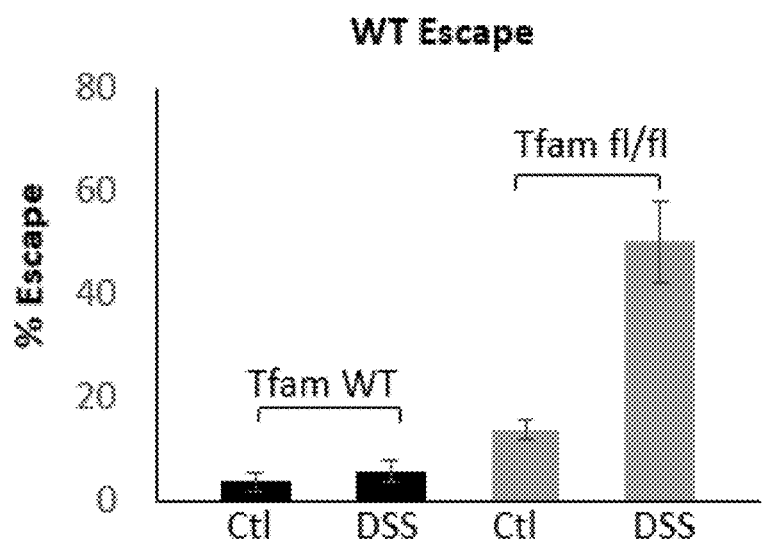

While IEC migration across ulcer surfaces was not significantly altered, a major defect at the ulcer surface was observed in TFAM KO IEC. As crypts began reconstituting ulcer surfaces, Tom$^+$ WT crypts exhibited profound levels of crypt fissioning, whereas crypt fissioning amongst GFP$^+$ T FAM KO crypts was greatly attenuated (FIG. 7C-E). In other words, the numbers of crypts undergoing crypt fissioning at the peak time point of ulcer healing (D15) was 6-fold higher in crypts populated by WT IEC compared to TFAM KO IEC (FIG. 7D). This correlated with a dramatic shift in the number of crypts populated by WT IEC compared to TFAM KO IEC at D15 (FIG. 7E) and a shift in the percent of Tom$^+$ IEC ("escapers") compared to GFP$^+$ IEC determined by FCM on D13 (FIG. 7F). These observations link mitochondrial deficiency to a fundamental failure to undergo the crypt fissioning needed for mucosal healing.

In CD and UC, epithelia mitochondrial dysfunction is evidenced by impaired mitochondrial respiration and ATP production. The previous Merit-funded data from colitis patients and epithelial TFAM-deficient mice indicate that mitochondrial respiration is needed for key steps in ulcer healing (e.g. crypt fissioning) (Background). The clinical relevance of these data is supported by data from a prospective study of naïve UC patients where authors found that suppression of mitochondrial-encoded complex genes, PPARα coactivator1α (PGC1α, mitochondrial biogenesis), and mitochondrial membrane potential (MMP) correlated with disease severity suggesting UC is driven by an IEC "mitochondriopathy". A prospective study in pediatric CD patients showed that upregulated mitochondrial respiratory chain mRNA predicts less severe disease course. These findings led us to postulate that increasing mitochondrial respiration offers a novel therapeutic goal in IBD. Under physiological condition, cells continuously produce or are exposed to ROS as byproducts of oxidative phosphorylation (OXPHOS). Mitochondrial ROS (mtROS) via electron leakage from the mitochondrial electron transport chain (ETC) complexes is driven by the proton motive force (PMF) across the inner mitochondrial membrane. Under normal physiologic conditions, mtROS are kept at low levels and PMF is kept below the threshold to cause ETC slippage of electrons. A small shift in cell redox status toward an oxidizing condition, rather than induce apoptosis, will stimulate adaptive signaling, leading to up-regulation of the antioxidant system to maintain redox status as well as promote cell survival. To improve mitochondrial function in IBD, a therapeutic agent based on the gold (Au) compound (auranofin) was developed, used for rheumatoid arthritis. This novel compound (AuPhos) increases mitochondrial oxygen consumption (OCR)/OXPHOS and nontoxic levels of mtROS production (FIGS. 1, 3) and cellular phosphoinositide 3-kinase (PI3K) signaling (FIG. 7).

Since the magnitude of ROS production is largely dependent on, and correlates with, PMF even a modest reduction via increased proton conductance (decreases PMF, the electrochemical proton gradient) across the mitochondrial inner membrane (uncoupling) reduces ROS formation. The flipside of this is that forcing electron donation into the ETC will increase mtROS even at lower PMF, this drives the rational for using AuPhos. Studies in DSS mice (FIG. 2) show that AuPhos attenuates acute colitis. Based on these data, the redox disparity between IEC in normal and colitis conditions favors AuPhos compound to serve as redox-based ulcer healing agent.

Example 5. High Resolution Respirometry (Oxygen Consumption Rate)

Isolated IECs will be suspended in a mitochondria respiration medium and integrated respiration evaluated using Oxygraph-2K (Oroboros Instruments). Briefly, the capacity of electron transport system (ETS) will be evaluated by direct titration of protonophore, carbonyl cyanide p-(trifluoromethoxy) phenylhydrazone (PCCP) after stabilization of routine respiration. After routine endogenous respiratory phase, cells will be permeabilized with digitonin and complex I (CI) substrates malate and pyruvate (5 mM, respectively).

OxPHOS will be then be stimulated by subsequent addition of ADP followed by additional CI substrate glutamate (5 mM). Further, addition of complex II (CII)-linked substrate succinate (10 mM) will enable convergent electron input via both CI and CII. OxPHOS will be inhibited by oligomycin (1 ug/ml) revealing LEAK respiration. Maximal respiratory capacity of ETS will be induced by FCCP titration. Inhibition of CI by rotenone (2 uM) will reveal CII-supported respiration. Residual non-mitochondrial oxygen consumption will be determined by addition of complex III inhibitor antimycin-A (1 ug/ml). Oxygen consumption rate (OCR) of isolated mitochondria will also be evaluated using Oxygraph-2K or high-throughput Seahorse XFe24 Extracellular Flux Analyzer (Agilent Technologies).

Example 6. Murine IEC Isolation for Protein Biochemistry and Colonoid Culture To isolate colonic IEC, murine colons will be lengthwise and washed in Ca$^{2+}$- and Mg$^+$-free HBSS (CMF-HBSS). The tissue will be incubated for 1). 30 minutes at 4° C. in CMF-HBSS containing 10 mM DTT and 50 nM calyculin A and 2). 1 hour at 4° C. in CMF-HBSS with 10 mM EDTA and 50 nM calyculin A. Epithelial cells will be dislodged by vigorous shaking. Large pieces of tissue will be discarded, and epithelial cells harvested by centrifugation at 40 g/5 min. Cell will be used immediately to grow colonoids by imbedding them in Matrigel or frozen at −80° C. for future use in protein biochemistry.

Example 7. Colonoid Culture

Murine IEC will be isolated as above. Human biopsies will be incubated for 15 min at RT in CMF-HBSS/10 mM DTT with following incubation at 4° C. CMF-HBSS/8 mM EDTA for 75 min. Epithelial cells will be dislodged by vigorous shaking. Large pieces of tissue will be discarded, epithelial cells harvested by centrifugation at 40 g/5 min and imbedded in Matrigel. Both human and mouse colonoids will be grown in WRN medium (conditional medium from L-WRN cells (ATCC CRL-3276)) supplemented with 20% FBS, 500 nM A 83-01, 10 μM SB 202190, 10 μM Y27632, 2.5 μM CHIR99021, 100 μg/ml piromicin and 2.5 μg/ml amphotericin. Colonoids will be passaged every 5-7 days. NCM460 cells derived from normal human colon mucosa were purchased from INCELL Corporation, and will be cultured in M3:10 medium with 30% conditioned medium from previous culture under standard incubation conditions.

Example 8. Au(III)[C^N] Diphosphine Compound (AuPhos)

All reactions will be carried under ambient conditions in air unless otherwise noted. Solvents of ACS grade (Pharmco-Aaper) will be used as is and dry solvents will be obtained from standard methods. The starting Au(III) cyclometalated complexes; [2-benzylpyridine]Au(III)Cl$_2$ and [2-benzoylpyridine]Au(III)Cl$_2$ will be prepared according to a modified procedure from the instant inventors. All compounds with purity of ³97% will be used. AuPhos will be prepared by reacting Au(III) starting material ([2-benzylpyridine]Au(III)Cl$_2$ and [2-benzoylpyridine]Au(III)Cl$_2$) and the 1,2-Bis(diphenylphosphino)benzene. Briefly (2-benzylpyridine)Au(III)Cl$_2$ (63 mg, 0.144 mmol) will be suspended in 10 mL of chloroform in a 100 mL round bottom flask and stirred at room temperature. 1,2-Bis(diphenylphosphino)benzene (65 mg, 0.146 mmol) will be added into the reaction solution. The reaction will be stirred at room temperature for 30 min and monitored by TLC using 5:95 MeOH: CH$_2$Cl$_2$ as an eluent. Separation of compound will be achieved via flash chromatography using CombiFlash Rf+ Lumen with 5:95 MeOH:CH$_2$Cl$_2$.

Example 9. Methods of Barrier Testing in Human Colonoid Monolayer 3D colonoids grown in Matrigel domes will be dissociated into single cell suspension and plated on Matrigel-coated Transwell inserts to form monolayers. After reaching of confluence cell monolayers will be treated as proposed and transepithelial electrical resistance (TEER) will be measured (EVOM2 epithelial voltammeter with STX3 electrodes (World Precision Instruments)). The values will be corrected from their corresponding background and account for the total area of the samples. The amount of permeated FITC-dextran 4.4 kDa (FD4) through the epithelial monolayers grown on Transwell inserts will be determined by fluorescent reading. As controls, the flux through the porous Transwell insert membranes coated with a thin layer of Matrigel and through the porous membranes alone will be measured.

Example 10. AuPhos Modulates IEC Mitochondrial Respiratory Function

Figure 8A:
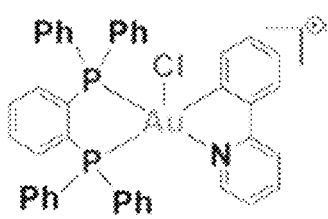
FIGS. 8A-8J present properties of AuPhos.
Figure 8B:
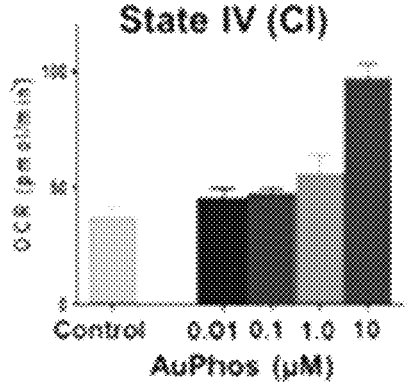
Figure 8C:
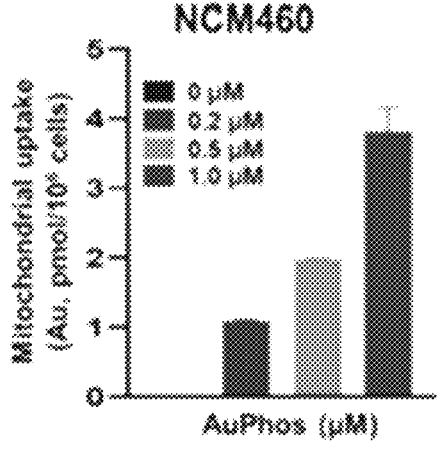
Figure 8D:
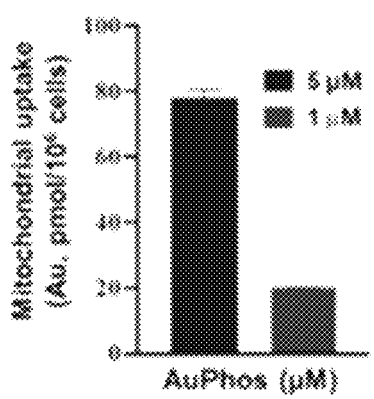

Taking advantage of the unique electrochemical properties and excellent safety profile of gold in humans/preclinical animal models, a gold compound with superior physiological stability to modulate distinct mitochondrial processes including mitochondrial respiration (OXPHOS) was designed. Changing the geometry and stabilizing ligands of gold compounds, such as the use of bidentate frameworks, promote different mitochondrial effects. A systematic SAR study was used to identify a gold (III) compound scaffold known as, AuPhos (FIG. 8A) that directly and rapidly enhances mitochondrial respiration in vitro and in vivo (FIG. 8B). Using different cellular models, AuPhos localizes in the mitochondria of normal colon epithelial cells (FIG. 8C) and cancerous epithelial cells (FIG. 8D).

Figure 8E:
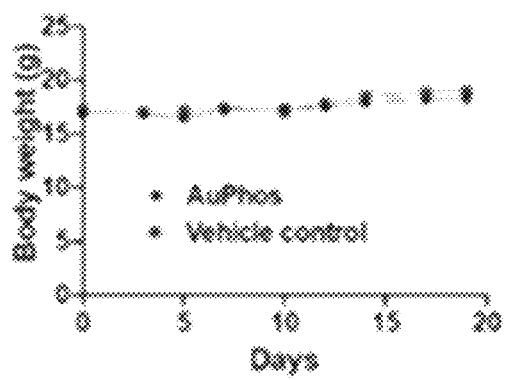
Figure 8F:
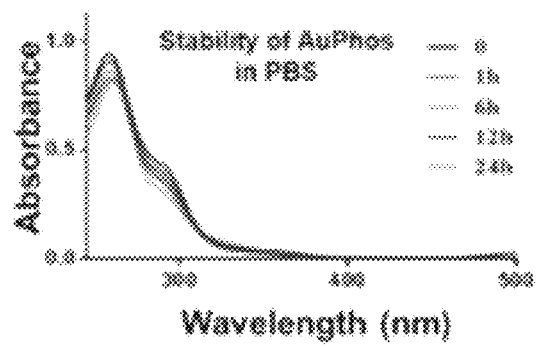
Figure 8G:
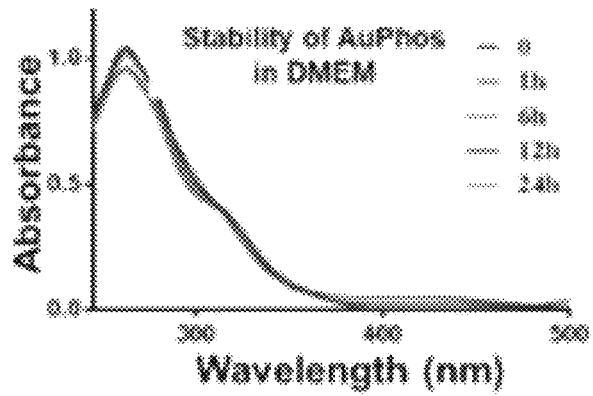
Figure 8H:
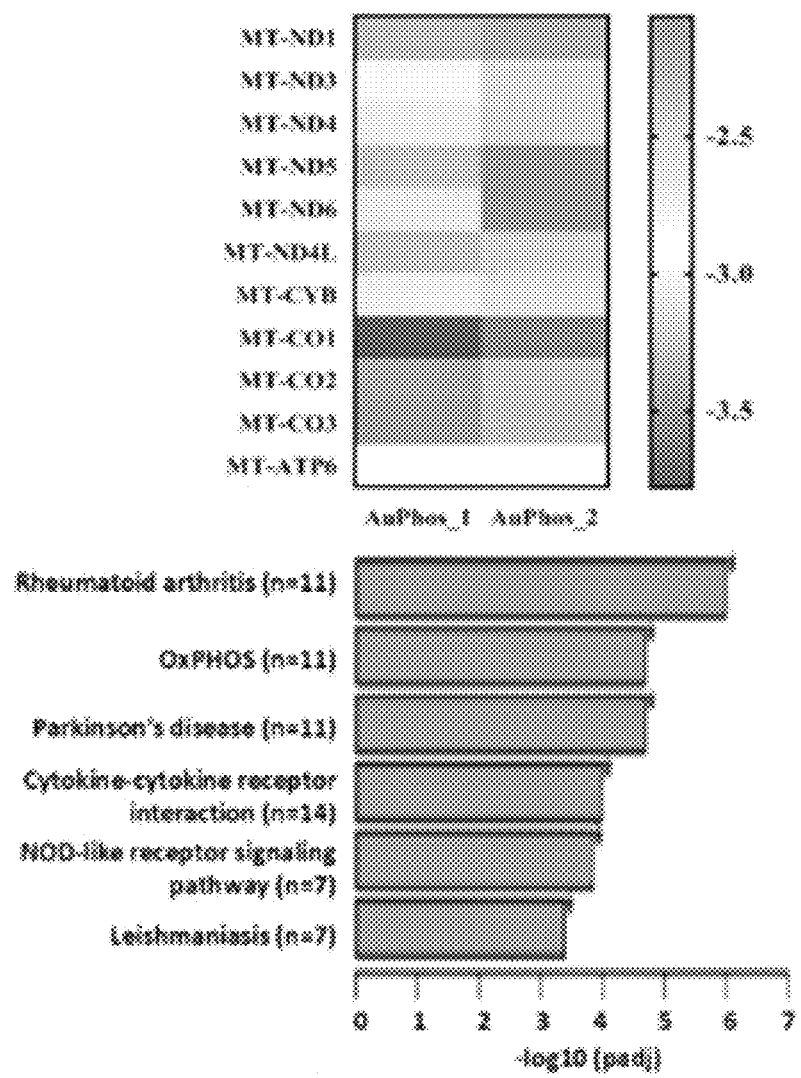
Figure 8I:
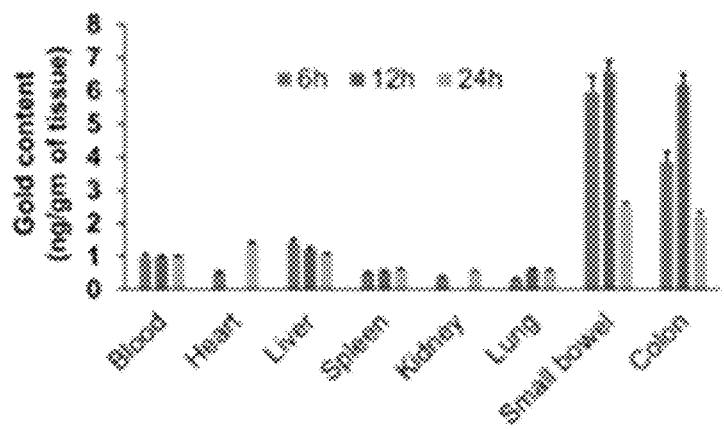
Figure 8J:
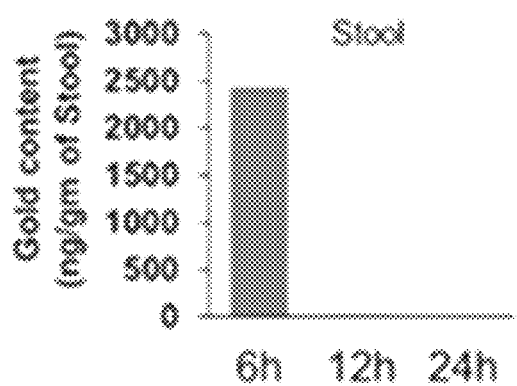

Detailed mitochondrial studies using mouse liver mitochondria demonstrate a significant increase in mitochondrial respiration induced by AuPhos in a dose-dependent manner (FIG. 8B). This observation was mitochondrial complex I-driven when different substrates, i.e. pyruvate and succinate, were used to measure the OCR. Transcriptomics was used to study global changes in mRNA in response to a 12 h exposure of AuPhos to MDA-MB-231 cells (FIG. 8H). Analysis of differentially expressed genes reveal that mitochondrial OXPHOS genes: MT-ND1-5, MT-CYB, MT-CO1-3, and MTATP6 were modulated. Interestingly, AuPhos retains excellent solution stability (FIG. 8F,G) and no toxicity in mice (FIG. 8E) over 20 days (liver toxicity also not observed, data not shown). Analysis of the tissue biodistribution (FIG. 8I) after a single oral 25 mg/kg dose shows clear accumulation in the small and large bowel tissues with evacuation in the stool by 12 h (FIG. 8J). Together these data help establish AuPhos as a potential IBD therapy.

Example 11. Efficacy of AuPhos in the Treatment of Colitis

Figure 9A:
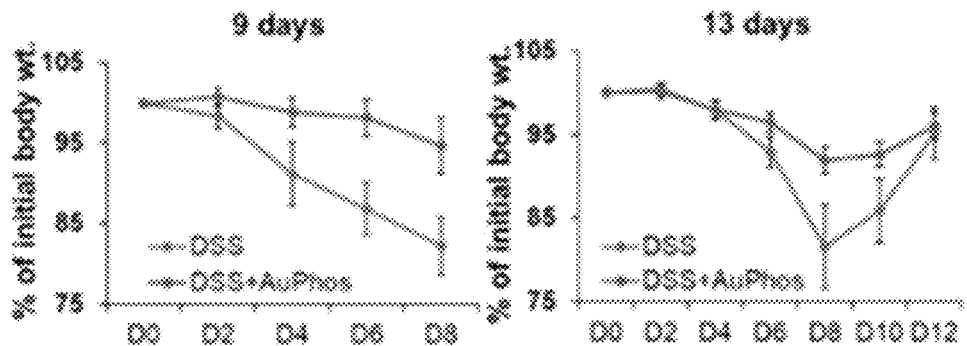
FIGS. 9A-9C show that AuPhos improves DSS-induced colitis.
Figure 9B:
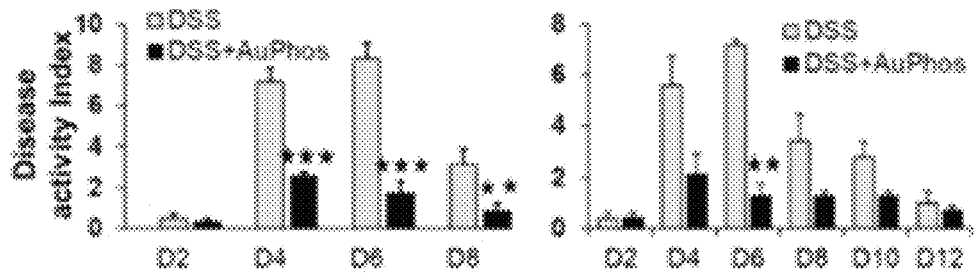
Figure 9C:
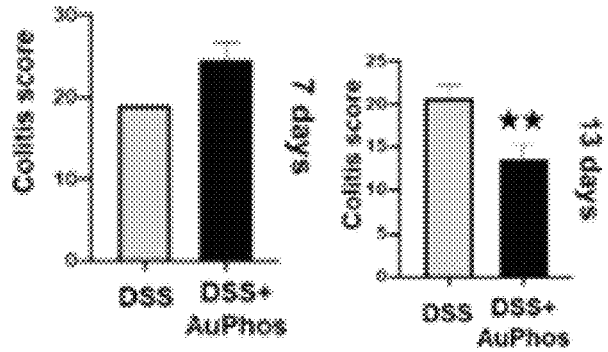
Figure 9D:
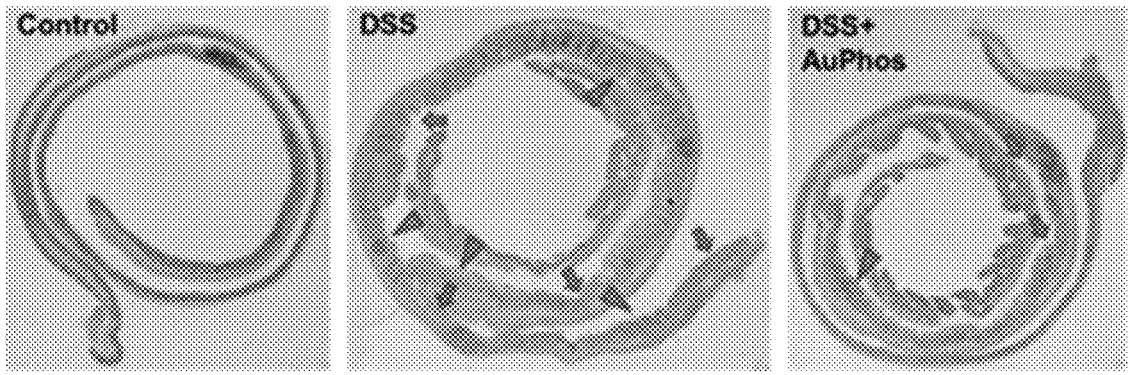
FIG. 9D includes images showing results for changes with 2% DSS given for 7 days followed by water. AuPhos was started (25 mg/kg q 3D) on DAY1. Representative images of H&E staining of whole tissue scan from 13-day study. ★★<0.01, ★★★<0.0001.

Given the potential that AuPhos provides a novel approach to IBD therapy, DSS colitis mice were given (2% DSS×7D) 25 mg/kg i.g. AuPhos every 3 days (from the start of DSS) until sacrifice. Results in FIG. 9A,B show that AuPhos significantly reduces weight (Wt) loss and DAI (e.g. bleeding, diarrhea, Wt loss) with significant decreases in tissue histologic indices (colitis score) seen at 13D (FIG. 9C). FIG. 9D tissue histology shows a resolution of colonic ulceration throughout the left colon in AuPhos treated mice.

Example 12. Auphos-Induced Iec Mitochondrial Respiration In Vivo

Figure 10A:
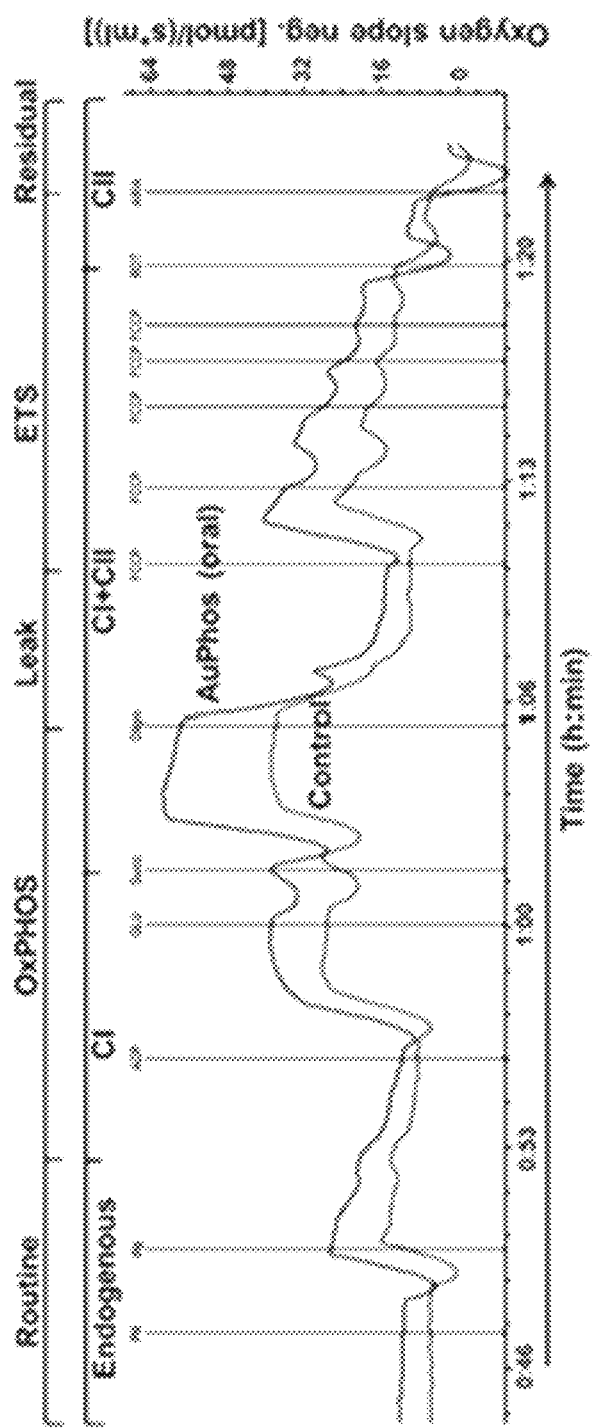
FIGS. 10A-10D show that AuPhos increases mitochondrial respiration.
Figure 10B:
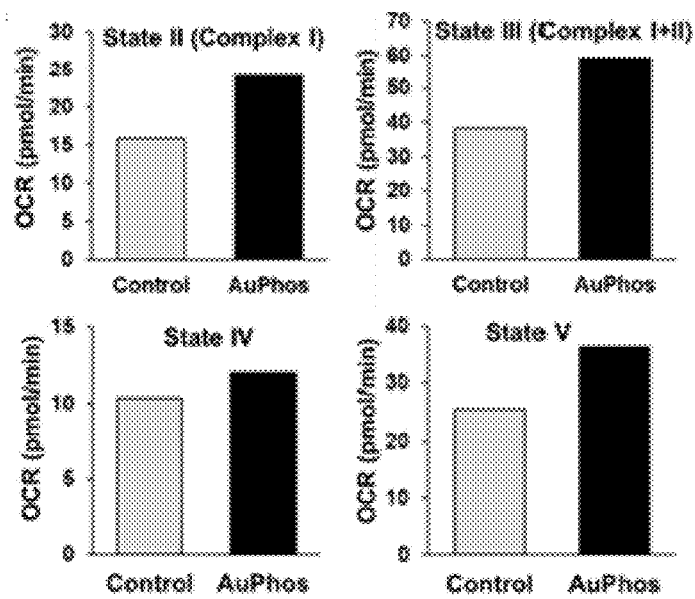
Figure 10C:
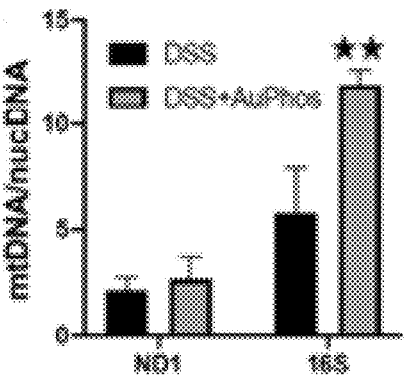
Figure 10D:
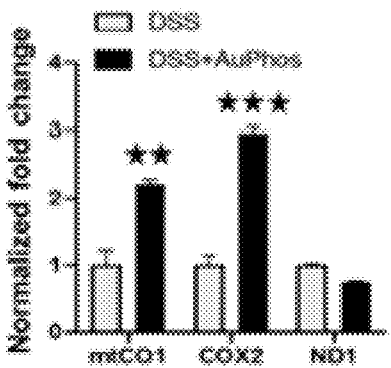

To examine effects of AuPhos on colonic IEC in vivo, mice were given AuPhos every 3D×3 and freshly isolated colonic IEC crypts isolated for assessment of mitochondrial OCR using the OROBOROS 2K analyzer. Data in FIG. 10A show the Oxygraph display of OCR for IEC from control and AuPhos-treated mice indicating that AuPhos increased OCR in IEC in vivo from states II-V (FIG. 10B). Further studies of the IEC from these mice showed that AuPhos increased mtDNA (FIG. 10C) and mRNA for mitochondrial CO1 and COX2 (FIG. 10D). Overall, these data represent powerful in vivo evidence that AuPhos induces IEC mitochondrial respiration (and biogenesis), both key components to its proposed mechanism of action.

Example 13. AuPhos Induces mtROS and $H_2O_2$ Production in Colonid IEC

Figure 11A:
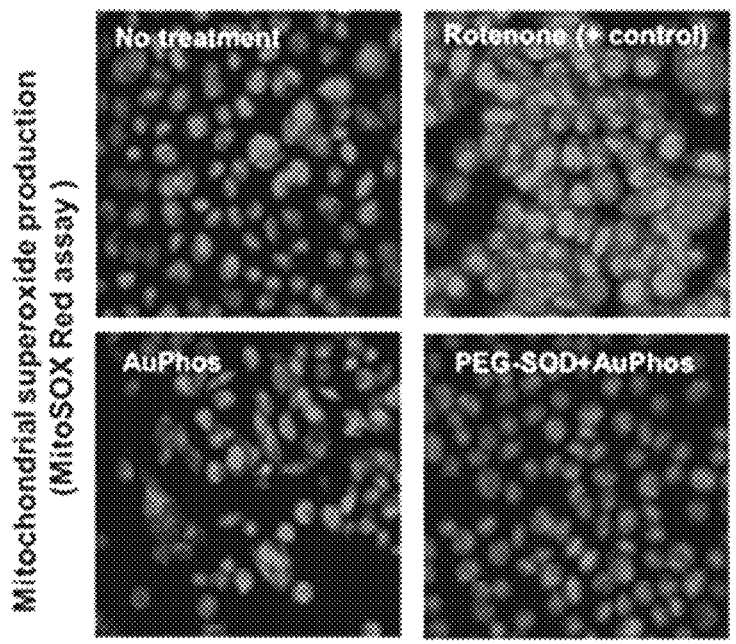
FIGS. 11A-11D shows Effect of AuPhos on ROS production.
Figure 11B:
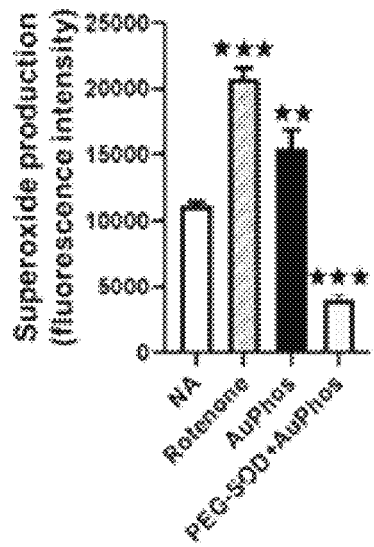
Figure 11C:
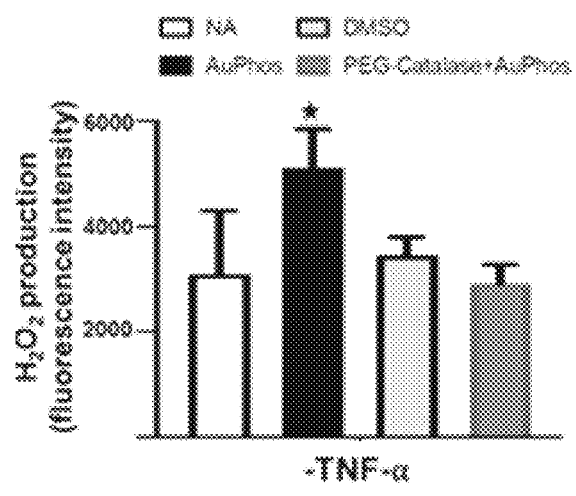
Figure 11D:
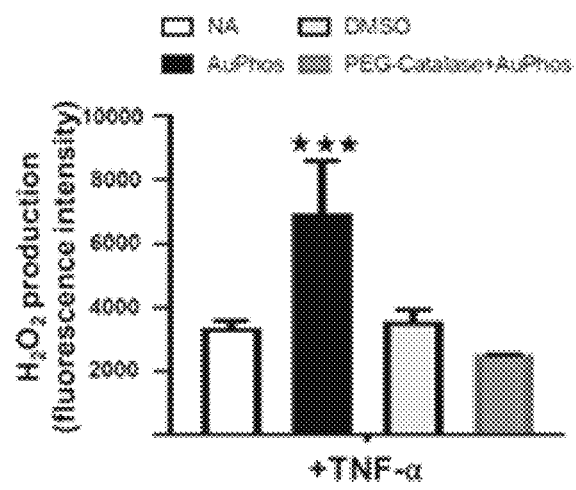

Given the in vivo data in FIG. 10, it was determined if AuPhos increases ROS levels within mitochondria (mtROS). To examine this possibility, colonic NCM460 cells were cultured, treated with a positive control (Rotenone), AuPhos (200 nM) or AuPhos with PEG-SOD (negative control) and analyzed with MitoSOX Red (an indicator of mitochondrial superoxide). Data in FIGS. 11A and 11B show that AuPhos induces a 45% rise in mtROS production that was specifically inhibited with PEG-SOD. Studies in FIGS. 11C and 11D used human colonoids isolated from normal patients to examine effects of AuPhos on hydrogen peroxide ($H_2O_2$) production from normal and low-dose TNF-stimulated colonoids. Findings indicate that AuPhos-induced ROS production increased in normal and TNF-treated cells (analogous to IBD IEC) and specifically digested with PEG catalase.

Figure 12A:
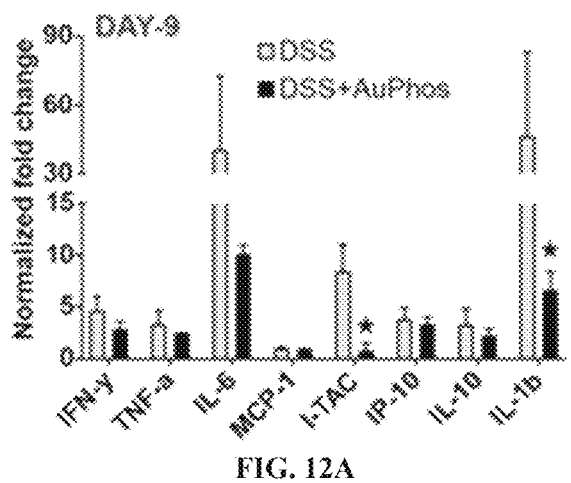
FIGS. 12A-12D show that AuPhos reduces mRNA for inflammation markers.
Figure 12B:
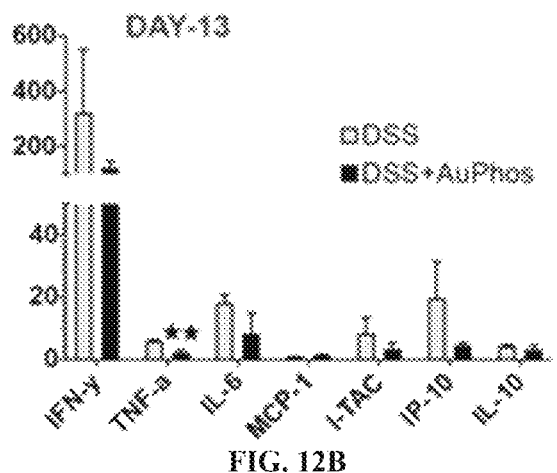
Figure 12C:
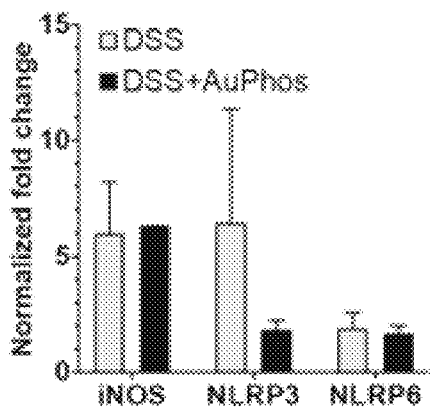
Figure 12D:
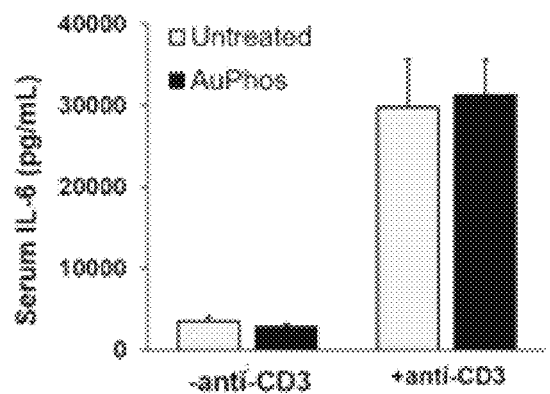

Example 14. AuPhos Attenuates Mucosal mRNA for Inflammatory Cytokine and Inflammasome Mediators Findings in FIG. 9A-9D indicate that AuPhos attenuates tissue inflammation and enhances mucosal healing in DSS colitis mice. To interrogate the effects of AuPhos on Th1 and Treg cytokine production as well as chemokine and inflammasome mediators, mRNA from mice at time points indicated (as in FIG. 9A-9D). Results show that AuPhos reduces pro-inflammatory cytokine typical of cell mediated immunity (IFNγ, TNF, IL-6 and IL-10) as well as chemokine-mediators of colitis (MCP-1, I-TAC and IP-10) (FIG. 12A, B) as well as markers of inflammasome signaling (FIG. 12C). To test the question of whether AuPhos affected leukocytes directly, control and AuPhos-treated (25 mg/kg i.g. dosed every 3d×2) were injected with anti-CD3 mAb (antiTCR mAb). It is known that CD3 mAb induces a cytokine storm in the periphery and intestine. Data in FIG. 12D show that AuPhos did not affect anti-CD3 induced increases in serum IL-6. Further study is indicated to assess effects of AuPhos on intestinal cytokine in CD45-sorted mice but one possible explanation is that changes in mucosal cytokine, as seen in FIGS. 12A and 12B, may be secondary to improvements in IEC function.

Figure 15:
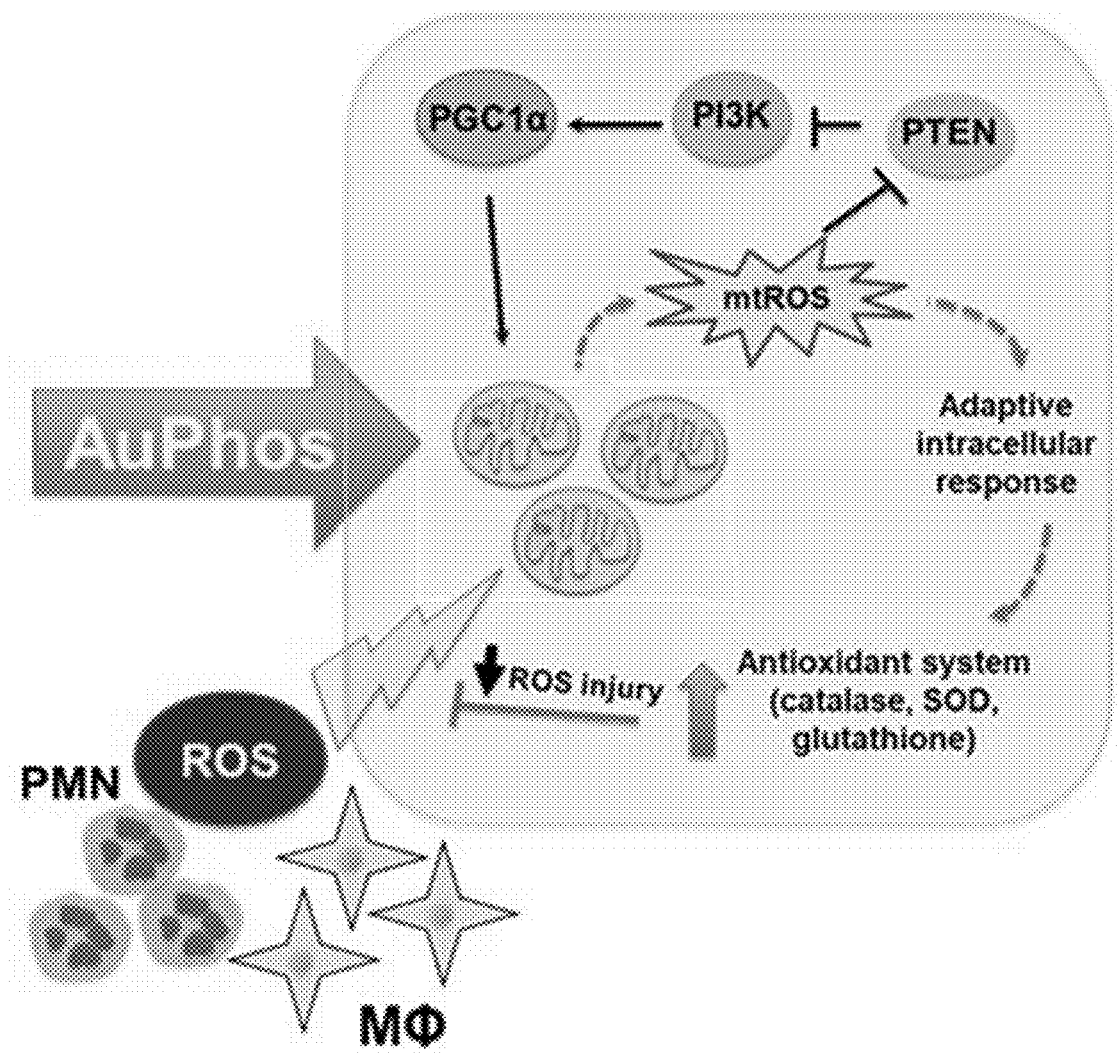
FIG. 15 is a schematic illustrating the beneficial role of AuPhos-induced mitochondrial respiration in colonic IEC in colitis.

Given the current focus on interrogating mechanisms of AuPhos-induced treatment effects in human colitis, it is likely that AuPhos attenuates tissue inflammation in IBD by enhancing IEC mitochondrial function (respiration and biogenesis). A fundamental clinical problem in IBD is the failure of healing in mucosal ulceration. Previous studies (Progress Report) and others point to mitochondrial dysfunction as a major reason why epithelial surfaces do not heal in IBD. Studies presented here show evidence that a VA-cosponsored new drug (AuPhos) improves colitis healing by improving "endogenous" mitochondrial respiration and mtROS production (FIG. 15). However, prior reviews raised legitimate concerns regarding the effects of enhanced mitochondrial respiration on overall levels of cell ROS and oxidant stress. Studies here will examine effects and mechanisms of AuPhos effects on TNF-stimulated colonoids [e.g. mitochondrial respiration, overall ROS levels, adaptive (anti-oxidant) responses and signaling (PI3K, etc)]. Colonoid lines from normal patients as well as lines form IBD patients with polymorphisms in the REDOX pathway will be utilized to garner better "preclinical" information of how this agent may affect veterans with IBD.

Example 15. Piroxicam (Px)-Accelerated IL-10KO Model of Colitis

To indicate the kinetics of the severe chronic inflammation, the progression in histologic severity of inflammation (FIG. 6A) and the percent of mice with severe colitis (FIG. 13A—right axis) are shown. Typical examples of colitis severity show severe transmural inflammation by D14 (at the end of Px treatment) and mucosal ulceration with signs of chronicity by D28.

Figure 13A:
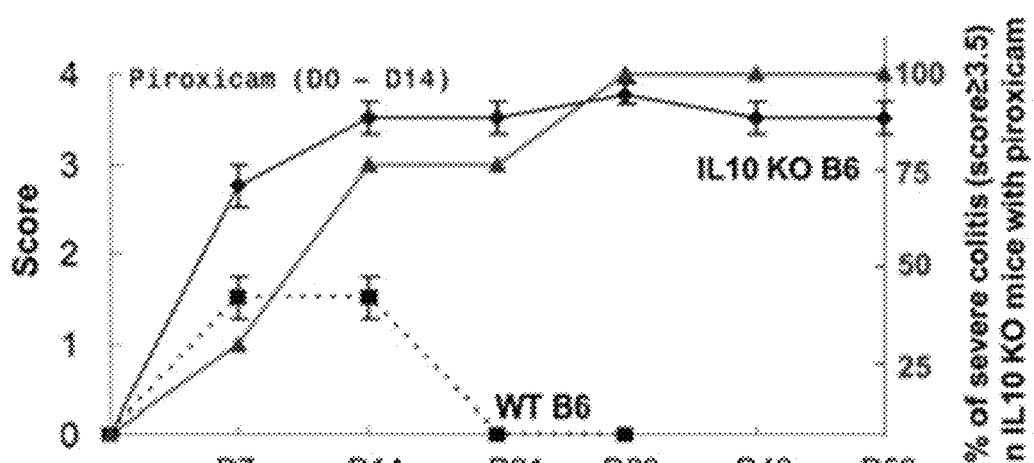
FIGS. 13A and 13B show Px-accelerated IL-10 KO model of colitis.
Figure 13B:
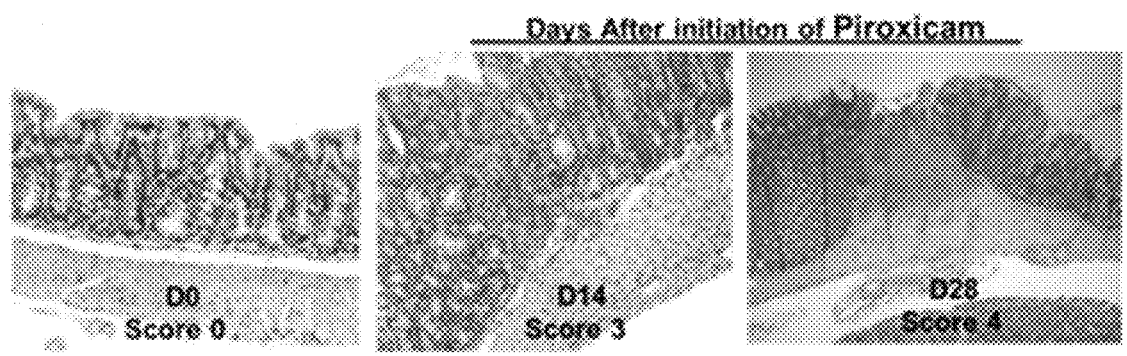
Figure 14A:
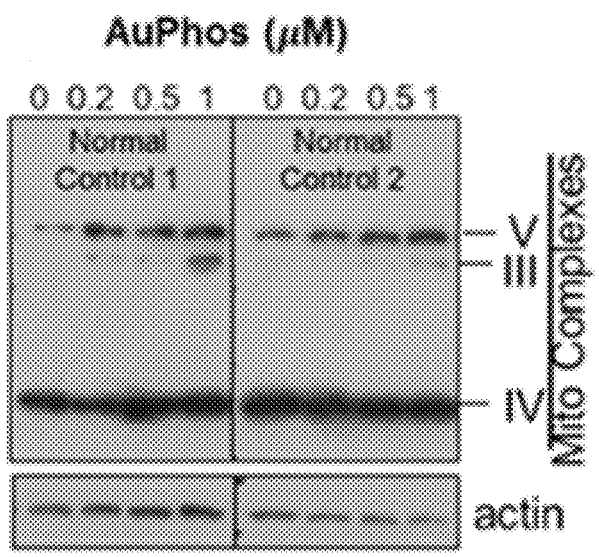
FIGS. 14A-14D shows AuPhos induction of mitochondrial biogenesis and PI3K signaling in human biopsies and colonic IEC.
Figure 14B:
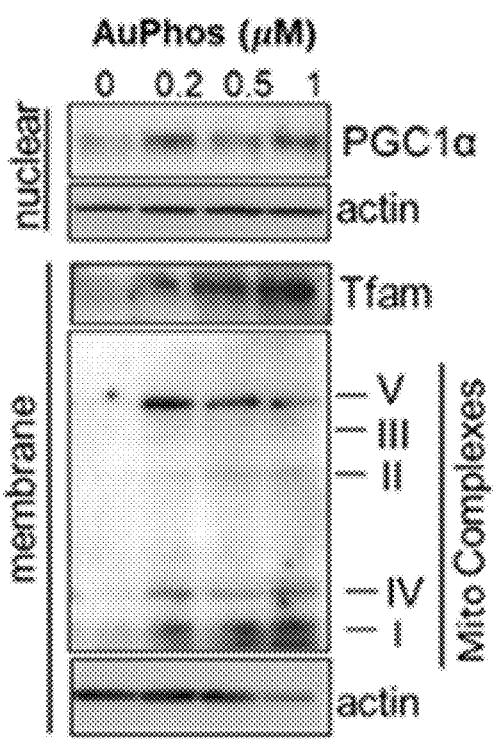
Figure 14C:
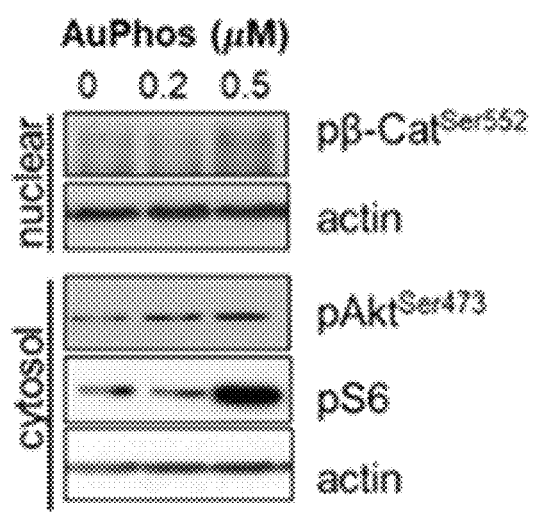
Figure 14D:
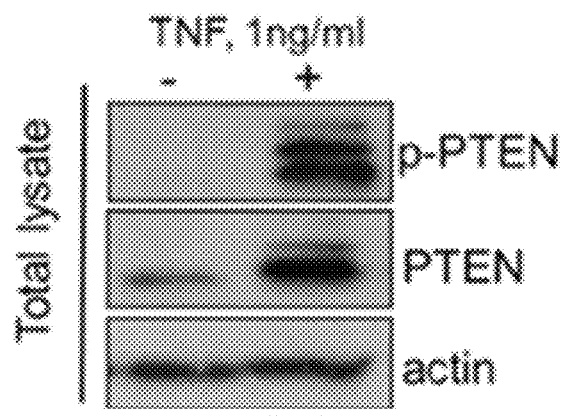

The effects of AuPhos in Px-accelerated IL-10KO mice by beginning treatment on D21 (7D after cessation of Px) when colitis is severe is shown in FIG. 13A. AuPhos-induced mitochondrial biogenesis and PI3K signaling. To examine the effect of AuPhos on mitochondrial biogenesis in human colonic IEC, fresh biopsies were cultured with a dose range of AuPhos and examined (after 3 h) for mitochondrial complex levels. Interestingly, there was a rapid increased in complexes, possibly due to reduced degradation (FIG. 14A). Subsequent studies in NCM460 cells (FIG. 14B) showed that AuPhos induces PGC1a and TFAM, known inducers of mitochondrial biogenesis and downstream of PI3K signaling. These findings correlated with those shown in FIG. 14C where AuPhos induced markers of PI3K [pAkt and pS6 kinase (pS6)]. Interestingly, AuPhos induction of nuclear pp-catenin5 which was previously shown is downstream of Akt signaling and an important mediator of crypt fissioning in colitis. Lastly, TNF stimulates p-PTEN in NCM460 cells indicative of ROS-induced PTEN inactivation as published. It is likely that induction of mtROS by AuPhos enhances PI3K signaling which promotes mitochondrial biogenesis (PGC1α and TFAM) as well as cooperate with Wnt to enhance β-catenin signaling in fissioning crypts.

Example 16. Summary

Shown in FIG. 15 are the predicted effects of AuPhos on IEC mitochondrial respiration-induced adaptive changes. Given the data that AuPhos promotes mitochondrial respiration (FIG. 10) and mtROS production (FIG. 11), it's likely that AuPhos will increase adaptive cellular responses by enhancing anti-oxidant enzyme levels and activity. This benefit will improve responses to oxidant stress from the IBD environment (e.g. PMN and macrophage ROS). In addition to enhancing resistance to the deleterious effects of oxidant stress, it is likely that AuPhos-induced mtROS phosphorylates (and inactivates) PTEN, the phosphatase inhibitor of PI3K.

Activation of PI3K signaling further support mitochondrial biogenesis via PGC1α. Not shown is the other effect of PI3K signaling on β-catenin signaling and fissioning published by the instant inventors. This later effect may synergize with Wnt to promote crypt fissioning, a response, recently shown, is dependent on mitochondrial respiration and a likely cause of deficient ulcer healing in IBD.

Example 17. AuPhos Modulates IEC Mitochondrial Respiratory Function

Figure 16A:
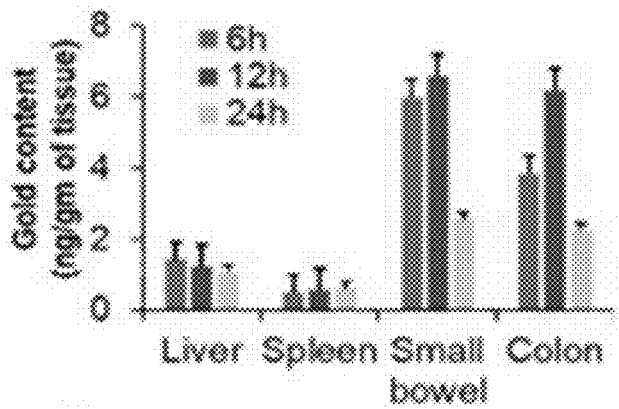
FIGS. 16A-16E illustrate the pharmacokinetics and effects of AuPhos on mitochondrial bioenergetics.
Figure 16B:
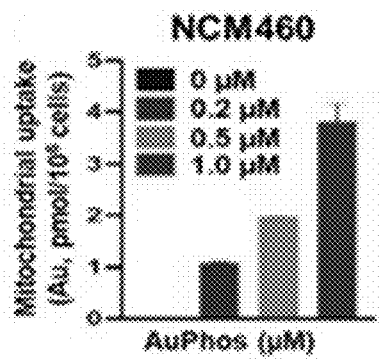
Figure 16C:
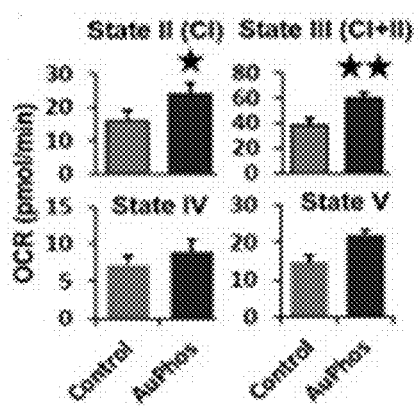
Figure 16D:
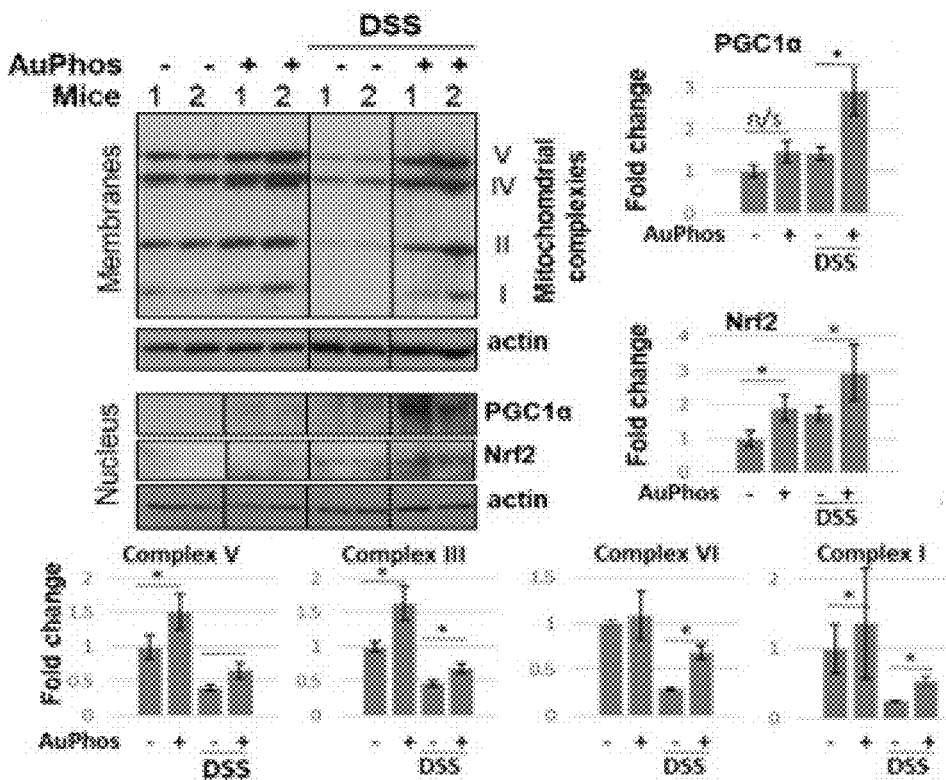
Figure 16E:
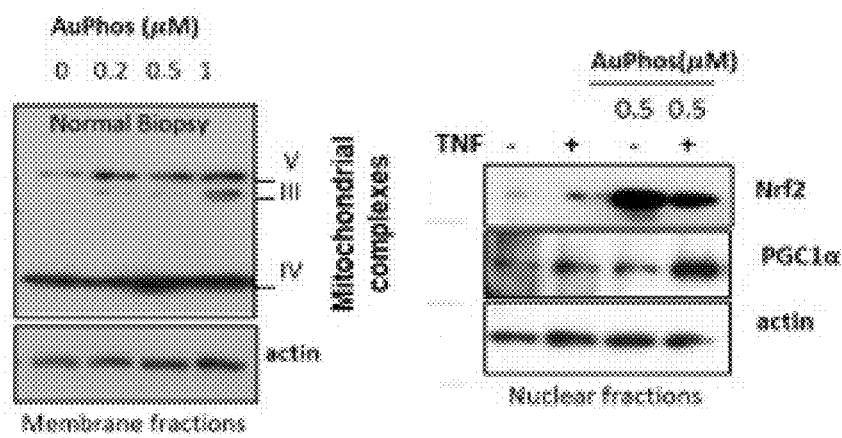

Taking advantage of the unique electrochemical properties and excellent safety profile of gold in humans, a stable gold compound was designed to modulate mitochondrial processes including oxidative phosphorylation (OXPHOS). Changing the geometry and stabilizing ligands of gold compounds, such as the use of bidentate frameworks, was found to promote different mitochondrial effects. A systematic structure activity relationship (SAR) study was used to identify a gold(III) compound scaffold known as AuPhos that localizes to mitochondria in small bowel (SB) and colonic mucosa where it localizes to the intestine and enhances mitochondrial respiration (FIG. 16A-C). These data indicate that AuPhos effects are mitochondrial complex I-driven as supported by the oxygen consumption rate (OCR) when different substrates, i.e. pyruvate and succinate, were used. IEC (FIG. 16C). Analysis of the tissue biodistribution (FIG. 16A) after a single oral 25 mg/kg dose shows clear accumulation in the small and large bowel tissues with evacuation in the stool by 12 h (data not shown). These examples illustrate that AuPhos has utility for "gut selective" IBD therapy. Further analysis of the effect of AuPhos on IEC mitochondria and cell signaling revealed that AuPhos increases mitochondrial complex levels in control and DSS colitis mice (FIG. 16D) associated with increased Nrf2 and PGC1α levels indicative of enhanced mitochondrial respiration and mitochondrial biogenesis. Data in AuPhos-treated human biopsies confirms that the drug also increases mitochondrial complex levels and downstream signaling in human mucosal tissue (FIG. 16E). Together these data support the contention that AuPhos increases IEC mitochondrial respiration with downstream signaling effects that promote further mitochondrial biogenesis.

Figure 17A:
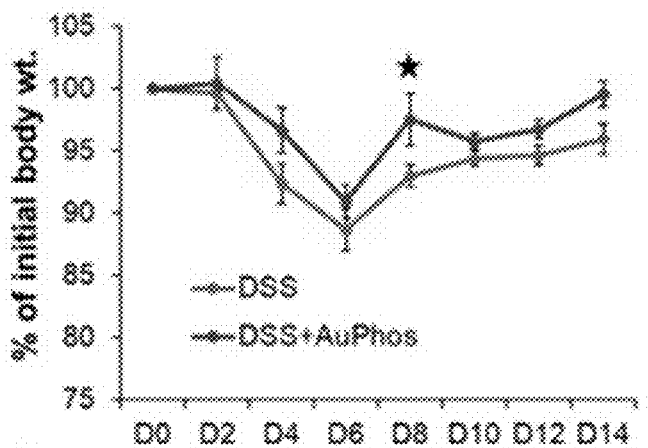
FIGS. 17A-17F illustrate that AuPhos improves DSS-induced colitis. Results shown are for changes with 2% DSS given for 7 days followed by water. AuPhos was started (25 mg/kg q3D) on DAY1.
Figure 17B:
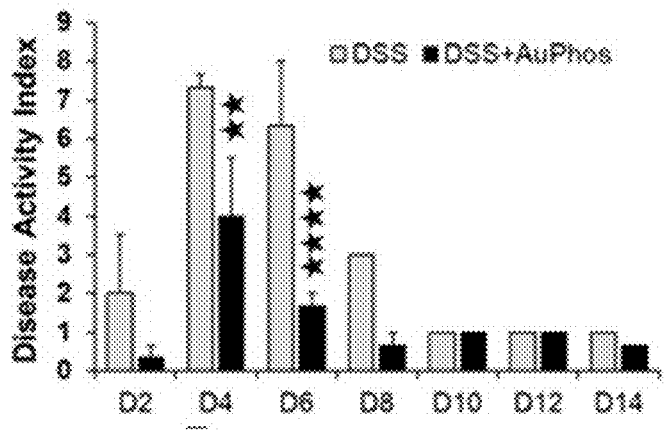
Figure 17C:
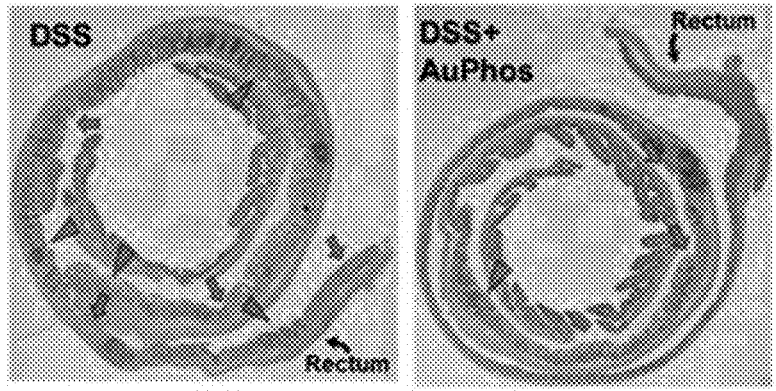
Figure 17D:
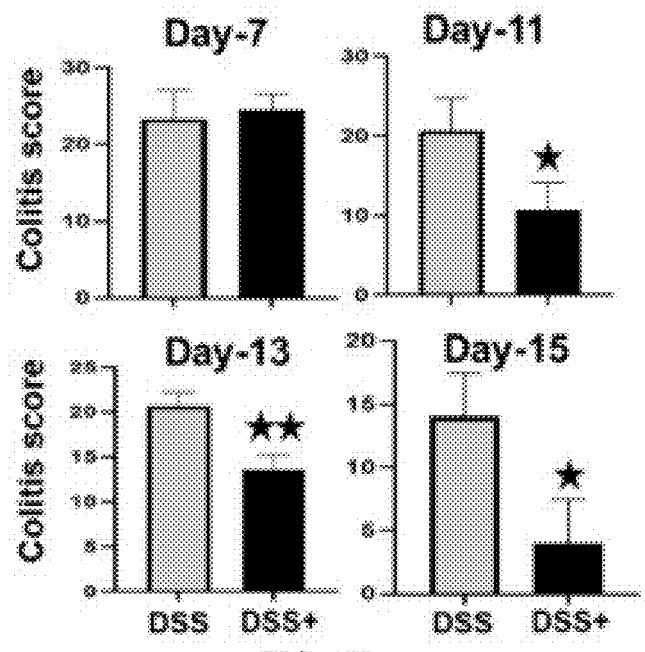
Figure 17E:
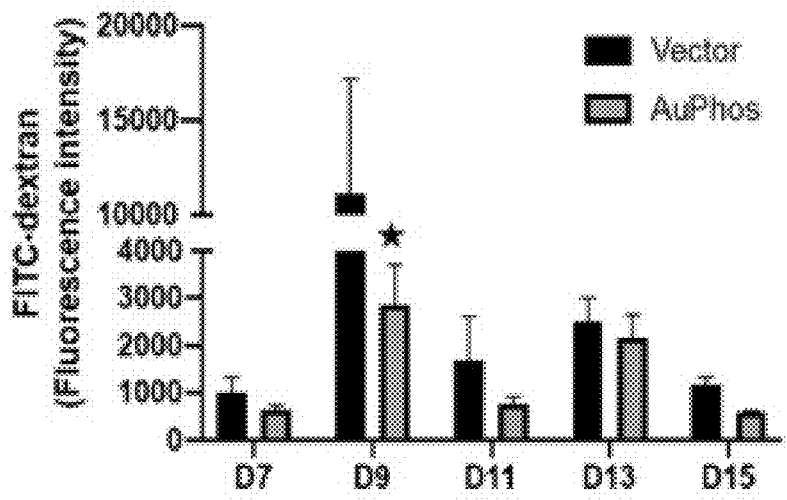
Figure 17F:
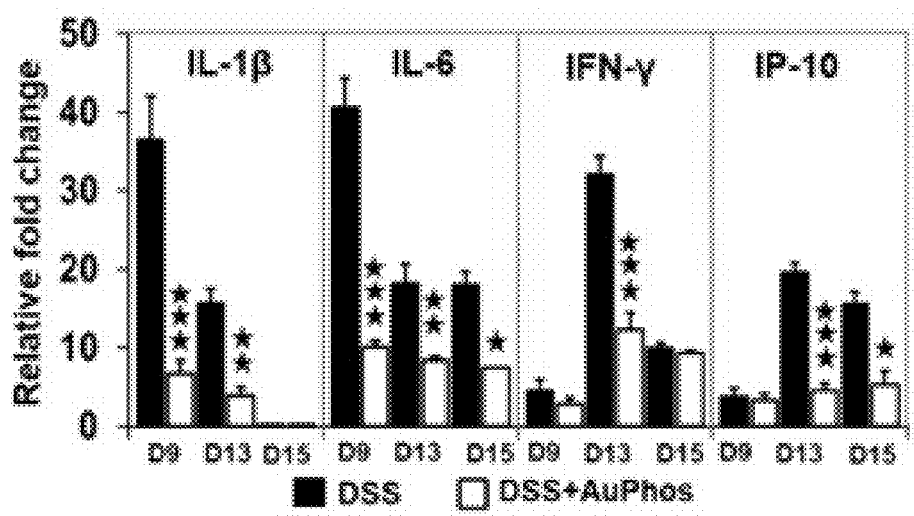

The efficacy of AuPhos in the treatment of colitis. Given the potential that AuPhos provides a novel approach to IBD therapy, DSS colitis mice (2% DSS×7D) were given intragastric (i.g.) AuPhos (25 mg/kg) every 3 days (from the start of DSS) until sacrifice. Results in FIGS. 17A and 17B show that AuPhos significantly reduces weight (Wt) loss and disease activity index (DAI) (e.g. bleeding, diarrhea, Wt loss) with significant decreases in tissue histology indices (colitis score) seen at D11, 13 and 15 (FIG. 17D). FIG. 17C tissue histology shows a resolution of colonic ulceration throughout the left colon in AuPhos-treated mice. Analysis of FITC-dextran permeability revealed that AuPhos treatment significantly improves barrier function at D9 when mucosal compromise was greatest (FIG. 17E). Mucosal mRNA (FIG. 17F) show that AuPhos reduces pro-inflammatory cytokine mRNA typical of cell mediated immunity, and chemokine-mediators of colitis. Together the data show that AuPhos improves mucosal healing and barrier function while attenuating markers of tissue inflammation (histology, inflammatory cytokine mRNA). The exciting possibility suggested here is that improved mucosal mitochondrial function may provide a novel means for accelerating mucosal healing in IBD.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Colombel J F, Narula N, Peyrin-Biroulet L. Management Strategies to Improve Outcomes of Patients With Inflammatory Bowel Diseases. Gastroenterology 2017; 152: 351-361 e5.
2. Kugathasan S, Denson L A, Walters T D, et al. Prediction of complicated disease course for children newly diagnosed with Crohn's disease: a multicentre inception cohort study. Lancet 2017; 389:1710-1718.
3. Goretsky T, Bradford E M, Ryu H, et al. A Cytosolic Multiprotein Complex Containing p85alpha Is Required for beta-Catenin Activation in Colitis and Colitis-associated Cancer. J Biol Chem 2016; 291:4166-77.
4. Goretsky T, Bradford E M, Ye Q, et al. Beta-catenin cleavage enhances transcriptional activation. Sci Rep 2018; 8:671.
5. Bradford E M, Thompson C A, Goretsky T, et al. Myo-inositol reduces beta-catenin activation in colitis. World J Gastroenterol 2017; 23:5115-5126.
6. Bradford E M, Ryu S H, Singh A P, et al. Epithelial TNF Receptor Signaling Promotes Mucosal Repair in Inflammatory Bowel Disease. J Immunol 2017; 199:1886-1897.
7. Feng Y, Demehri F R, Xiao W, et al. Interdependency of EGF and GLP-2 Signaling in Attenuating Mucosal Atrophy in a Mouse Model of Parenteral Nutrition. Cell Mol Gastroenterol Hepatol 2017; 3:447-468.
8. Wechsler J B, Szabo A, Hsu C L, et al. Histamine drives severity of innate inflammation via histamine 4 receptor in murine experimental colitis. Mucosal Immunol 2018; 11:861-870.
9. Managlia E, Liu SXL, Yan X, et al. Blocking NF-kappaB Activation in Ly6c(+) Monocytes Attenuates Necrotizing Enterocolitis. Am J Pathol 2019; 189:604-618.
10. Ali N, Nguyen C B, Chandrakesan P, et al. Doublecortin-like kinase 1 promotes hepatocyte clonogenicity and oncogenic programming via non-canonical beta-catenin-dependent mechanism. Sci Rep 2020; 10:10578.
11. Wen Y A, Xiong X, Scott T, et al. The mitochondrial retrograde signaling regulates Wnt signaling to promote tumorigenesis in colon cancer. Cell Death Differ 2019; 26:1955-1969.
12. Shi Y, Dierckx A, Wanrooij P H, et al. Mammalian transcription factor A is a core component of the mitochondrial transcription machinery. Proc Natl Acad Sci USA 2012; 109:16510-5.
13. Martinez-Reyes I, Chandel N S. Mitochondrial TCA cycle metabolites control physiology and disease. Nat Commun 2020; 11:102.
14. Haberman Y, Karns R, Dexheimer P J, et al. Ulcerative colitis mucosal transcriptomes reveal mitochondriopathy and personalized mechanisms underlying disease severity and treatment response. Nat Commun 2019; 10:38.
15. Dahlhamer J M, Zammitti E P, Ward B W, et al. Prevalence of Inflammatory Bowel Disease Among Adults Aged >/=18 Years—United States, 2015. MMWR Morb Mortal Wkly Rep 2016; 65:1166-1169.
16. Park K T, Ehrlich O G, Allen J I, et al. The Cost of Inflammatory Bowel Disease: An Initiative From the Crohn's & Colitis Foundation. Inflamm Bowel Dis 2020; 26:1-10.
17. Hou J K, Kramer J R, Richardson P, et al. The incidence and prevalence of inflammatory bowel disease among U.S. veterans: a national cohort study. Inflamm Bowel Dis 2013; 19:1059-64.
18. Molander P, Kemppainen H, Ilus T, et al. Long-term deep remission during maintenance therapy with biological agents in inflammatory bowel diseases. Scand J Gastroenterol 2020; 55:34-40.
19. Taupin D, Podolsky D K. Trefoil factors: initiators of mucosal healing. Nat Rev Mol Cell Biol 2003; 4:721-32.
20. Lindemans C A, Calafiore M, Mertelsmann A M, et al. Interleukin-22 promotes intestinal-stem-cell-mediated epithelial regeneration. Nature 2015; 528:560.
21. Stappenbeck T S, Miyoshi H. The role of stromal stem cells in tissue regeneration and wound repair. Science 2009; 324:1666-9.

22. Miyoshi H, VanDussen K L, Malvin N P, et al. Prostaglandin E2 promotes intestinal repair through an adaptive cellular response of the epithelium. EMBO J 2017; 36:5-24.
23. Seno H, Miyoshi H, Brown S L, et al. Efficient colonic mucosal wound repair requires Trem2 signaling. Proc Natl Acad Sci USA 2009; 106:256-61.
24. Rodriguez-Colman M J, Schewe M, Meerlo M, et al. Interplay between metabolic identities in the intestinal crypt supports stem cell function. Nature 2017; 543:424-427.
25. Schell J C, Wisidagama D R, Bensard C, et al. Control of intestinal stem cell function and proliferation by mitochondrial pyruvate metabolism. Nat Cell Biol 2017; 19:1027-1036.
26. Weinberg S E, Chandel N S. Targeting mitochondria metabolism for cancer therapy. Nat Chem Biol 2015; 11:9-15.
27. Chandel N S. Mitochondria as signaling organelles. BMC Biol 2014; 12:34.
28. Sena L A, Chandel N S. Physiological roles of mitochondrial reactive oxygen species. Mol Cell 2012; 48:158-67.
29. Sullivan L B, Chandel N S. Mitochondrial reactive oxygen species and cancer. Cancer Metab 2014; 2:17.
30. DeBerardinis R J, Chandel N S. Fundamentals of cancer metabolism. Sci Adv 2016; 2:e1600200.
31. Samavati L, Lee I, Mathes I, et al. Tumor necrosis factor alpha inhibits oxidative phosphorylation through tyrosine phosphorylation at subunit I of cytochrome c oxidase. J Biol Chem 2008; 283:21134-44.
32. Santhanam S, Rajamanickam S, Motamarry A, et al. Mitochondrial electron transport chain complex dysfunction in the colonic mucosa in ulcerative colitis. Inflamm Bowel Dis 2012; 18:2158-68.
33. Sifroni K G, Damiani C R, Stoffel C, et al. Mitochondrial respiratory chain in the colonic mucosal of patients with ulcerative colitis. Mol Cell Biochem 2010; 342:111-5.
34. Chaiswing L, Oberley T D. Extracellular/microenvironmental redox state. Antioxid Redox Signal 2010; 13:449-65.
35. Go Y M, Jones D P. Redox compartmentalization in eukaryotic cells. Biochim Biophys Acta 2008; 1780:1273-90.
36. Peluffo G, Radi R. Biochemistry of protein tyrosine nitration in cardiovascular pathology. Cardiovascular Research 2007; 75:291-302.
37. Kim G, Weiss S J, Levine R L. Methionine oxidation and reduction in proteins. Biochimica et biophysica acta 2014; 1840:901-905.
38. Carballal S, Bartesaghi S, Radi R. Kinetic and mechanistic considerations to assess the biological fate of peroxynitrite. Biochim Biophys Acta 2014; 1840:768-80.
39. Radi R. Oxygen radicals, nitric oxide, and peroxynitrite: Redox pathways in molecular medicine. Proc Natl Acad Sci USA 2018; 115:5839-5848.
40. Pervaiz S, Clement M V. Superoxide anion: oncogenic reactive oxygen species? Int J Biochem Cell Biol 2007; 39:1297-304.
41. Ahmad I M, Aykin-Burns N, Sim J E, et al. Mitochondrial $O_2^{*-}$ and $H_2O_2$ mediate glucose deprivation-induced stress in human cancer cells. J Biol Chem 2005; 280:4254-63.
42. Handy D E, Loscalzo J. Redox regulation of mitochondrial function. Antioxidants & redox signaling 2012; 16:1323-1367.
43. Musch M W, Clarke L L, Mamah D, et al. T cell activation causes diarrhea by increasing intestinal permeability and inhibiting epithelial Na+/K+-ATPase. J Clin Invest 2002; 110:1739-47.
44. Alnadjim Z, Kayali Z, Haddad W, et al. Differential effects of T-cell activation on gastric and small bowel permeability in alcohol-consuming mice. Alcohol Clin Exp Res 2002; 26:1436-43.
45. Rius-Perez S, Torres-Cuevas I, Millan I, et al. PGC-1alpha, Inflammation, and Oxidative Stress: An Integrative View in Metabolism. Oxid Med Cell Longev 2020; 2020:1452696.
46. He X C, Yin T, Grindley J C, et al. PTEN-deficient intestinal stem cells initiate intestinal polyposis. Nat Genet 2007; 39:189-98.
47. Lee G, Goretsky T, Managlia E, et al. Phosphoinositide 3-kinase signaling mediates beta-catenin activation in intestinal epithelial stem and progenitor cells in colitis. Gastroenterology 2010; 139:869-81, 881 e1-9.
48. Leslie N R, Bennett D, Lindsay Y E, et al. Redox regulation of PI 3-kinase signalling via inactivation of PTEN. The EMBO journal 2003; 22:5501-5510.
49. Altay G, Larrañaga E, Tosi S, et al. Self-organized intestinal epithelial monolayers in crypt and villus-like domains show effective barrier function. Scientific Reports 2019; 9:10140.
50. Novak E A, Mollen K P. Mitochondrial dysfunction in inflammatory bowel disease. Frontiers in Cell and Developmental Biology 2015; 3.
51. Komlodi T, Geibl F F, Sassani M, et al. Membrane potential and delta pH dependency of reverse electron transport-associated hydrogen peroxide production in brain and heart mitochondria. J Bioenerg Biomembr 2018; 50:355-365.
52. Batinic-Haberle I, Tovmasyan A, Spasojevic I. Mn Porphyrin-Based Redox-Active Drugs: Differential Effects as Cancer Therapeutics and Protectors of Normal Tissue Against Oxidative Injury. Antioxid Redox Signal 2018; 29:1691-1724.
53. Chaiswing L, St Clair W H, St Clair D K. Redox Paradox: A Novel Approach to Therapeutics-Resistant Cancer. Antioxid Redox Signal 2018; 29:1237-1272.
54. Skulachev V P. Role of uncoupled and non-coupled oxidations in maintenance of safely low levels of oxygen and its one-electron reductants. Quarterly Reviews of Biophysics 2009; 29:169-202.
55. Skulachev V P. Uncoupling: new approaches to an old problem of bioenergetics. Biochim Biophys Acta 1998; 1363:100-24.
56. Votyakova T V, Reynolds I J. DeltaPsi(m)-Dependent and -independent production of reactive oxygen species by rat brain mitochondria. J Neurochem 2001; 79:266-77.
57. In J G, Foulke-Abel J, Clarke E, et al. Human Colonoid Monolayers to Study Interactions Between Pathogens, Commensals, and Host Intestinal Epithelium. J Vis Exp 2019.
58. Xie H, Hanai J, Ren J G, et al. Targeting lactate dehydrogenase—a inhibits tumorigenesis and tumor progression in mouse models of lung cancer and impacts tumor-initiating cells. Cell Metab 2014; 19:795-809.
59. Sellers K, Fox M P, Bousamra M, 2nd, et al. Pyruvate carboxylase is critical for non-small-cell lung cancer proliferation. J Clin Invest 2015; 125:687-98.
60. Gamboa J L, Andrade F H. Muscle endurance and mitochondrial function after chronic normobaric hypoxia: contrast of respiratory and limb muscles. Pflugers Archiv: European journal of physiology 2012; 463:327-338.

61. Agnello M, Morici G, Rinaldi A M. A method for measuring mitochondrial mass and activity. Cytotechnology 2008; 56:145-9.
62. Mattiasson G. Flow cytometric analysis of isolated liver mitochondria to detect changes relevant to cell death. Cytometry A 2004; 60:145-54.
63. Saunders J E, Beeson C C, Schnellmann R G. Characterization of functionally distinct mitochondrial subpopulations. J Bioenerg Biomembr 2013; 45:87-99.
64. Lippert A R, Dickinson B C, New E J. Imaging mitochondrial hydrogen peroxide in living cells. Methods Mol Biol 2015; 1264:231-43.
65. Wei X, Xu Y, Xu F F, et al. RelB Expression Determines the Differential Effects of Ascorbic Acid in Normal and Cancer Cells. Cancer Research 2017; 77:1345-1356.
66. Kudin A P, Bimpong-Buta N Y, Vielhaber S, et al. Characterization of superoxide-producing sites in isolated brain mitochondria. J Biol Chem 2004; 279:4127-35.
67. Bienert G P, Chaumont F. Aquaporin-facilitated transmembrane diffusion of hydrogen peroxide. Biochim Biophys Acta 2014; 1840:1596-604.
68. Sies H. Hydrogen peroxide as a central redox signaling molecule in physiological oxidative stress: Oxidative eustress. Redox Biol 2017; 11:613-619.
69. Makrecka-Kuka M, Krumschnabel G, Gnaiger E. High-Resolution Respirometry for Simultaneous Measurement of Oxygen and Hydrogen Peroxide Fluxes in Permeabilized Cells, Tissue Homogenate and Isolated Mitochondria. Biomolecules 2015; 5:1319-38.
70. Chaiswing L, Zhong W, Liang Y, et al. Regulation of prostate cancer cell invasion by modulation of extra- and intracellular redox balance. Free Radic Biol Med 2012; 52:452-61.
71. Chance B, Sies H, Boveris A. Hydroperoxide metabolism in mammalian organs. Physiol Rev 1979; 59:527-605.
72. Breitzig M, Bhimineni C, Lockey R, et al. 4-Hydroxy-2-nonenal: a critical target in oxidative stress? Am J Physiol Cell Physiol 2016; 311:C537-C543.
73. Gegotek A, Skrzydlewska E. Biological effect of protein modifications by lipid peroxidation products. Chem Phys Lipids 2019; 221:46-52.
74. Petersen D R, Doom J A. Reactions of 4-hydroxynonenal with proteins and cellular targets. Free Radic Biol Med 2004; 37:937-45.
75. Formentini L, Santacatterina F, Nuñez de Arenas C, et al. Mitochondrial ROS Production Protects the Intestine from Inflammation through Functional M2 Macrophage Polarization. Cell Rep 2017; 19:1202-1213.
76. Zhang Y, Tian L, Sleiman P, et al. Bayesian analysis of genome-wide inflammatory bowel disease data sets reveals new risk loci. Eur J Hum Genet 2018; 26:265-274.
77. Denson L A, Jurickova I, Karns R, et al. Clinical and Genomic Correlates of Neutrophil Reactive Oxygen Species Production in Pediatric Patients With Crohn's Disease. Gastroenterology 2018; 154:2097-2110.
78. Huang H, Fang M, Jostins L, et al. Fine-mapping inflammatory bowel disease loci to single-variant resolution. Nature 2017; 547:173-178.
79. Zhong W, Weiss H L, Jayswal R D, et al. Extracellular redox state shift: A novel approach to target prostate cancer invasion. Free Radic Biol Med 2018; 117:99-109.
80. Robb E L, Gawel J M, Aksentijevic D, et al. Selective superoxide generation within mitochondria by the targeted redox cycler MitoParaquat. Free Radic Biol Med 2015; 89:883-94.
81. Yui S, Nakamura T, Sato T, et al. Functional engraftment of colon epithelium expanded in vitro from a single adult Lgr5+ stem cell. Nat Med 2012; 18:618-23.
82. Au-In J G, Au-Foulke-Abel J, Au-Clarke E, et al. Human Colonoid Monolayers to Study Interactions Between Pathogens, Commensals, and Host Intestinal Epithelium. JoVE 2019:e59357.
83. Dashdorj A, Kr J, Lim S, et al. Mitochondria-targeted antioxidant MitoQ ameliorates experimental mouse colitis by suppressing NLRP3 inflammasome-mediated inflammatory cytokines. BMC Medicine 2013; 11:178.
84. Goretsky T, Dirisina R, Sinh P, et al. p53 mediates TNF-induced epithelial cell apoptosis in IBD. Am J Pathol 2012; 181:1306-15.
85. Watson C L, Mahe M M, Helmrath M A. In vivo Fluorescein Isothiocyanate-dextran (FD4) Permeability Assay. Bio-protocol 2015; 5:e1618.
86. Schieber M, Chandel N S. ROS function in redox signaling and oxidative stress. Curr Biol 2014; 24:R453-62.
87. Long M D, Kappelman M D, Martin C F, et al. Role of Nonsteroidal Anti-Inflammatory Drugs in Exacerbations of Inflammatory Bowel Disease. Journal of clinical gastroenterology 2016; 50:152-156.
88. Schaur R J, Siems W, Bresgen N, et al. 4-Hydroxy-nonenal-A Bioactive Lipid Peroxidation Product. Biomolecules 2015; 5:2247-2337.
89. Formentini L, Pereira M P, Sinchez-Cenizo L, et al. In vivo inhibition of the mitochondrial H+-ATP synthase in neurons promotes metabolic preconditioning. The EMBO journal 2014; 33:762-778.
90. Santacatterina F, Sánchez-Cenizo L, Formentini L, et al. Down-regulation of oxidative phosphorylation in the liver by expression of the ATPase inhibitory factor 1 induces a tumor-promoter metabolic state. Oncotarget 2016; 7:490-508.
91. Klein A, Eliakim R. Non Steroidal Anti-Inflammatory Drugs and Inflammatory Bowel Disease. Pharmaceuticals (Basel, Switzerland) 2010; 3:1084-1092.
92. Brown J B, Cheresh P, Goretsky T, et al. Epithelial phosphatidylinositol-3-kinase signaling is required for beta-catenin activation and host defense against *Citrobacter rodentium* infection. Infect Immun 2011; 79:1863-72.
93. Brown J B, Lee G, Grimm G R, et al. Therapeutic benefit of pentostatin in severe IL-10-/- colitis. Inflamm Bowel Dis 2008; 14:880-7.
94. Gounaris E, Martin J, Ishihara Y, et al. Fluorescence endoscopy of cathepsin activity discriminates dysplasia from colitis. Inflamm Bowel Dis 2013; 19:1339-45.
95. Bradford E M, Thompson C A, Goretsky T, et al. Myo-inositol reduces β-catenin activation in colitis. World J Gastroenterol 2017; 23:5115-5126.
96. Su L, Shen L, Clayburgh D R, et al. Targeted epithelial tight junction dysfunction causes immune activation and contributes to development of experimental colitis. Gastroenterology 2009; 136:551-63.
97. Kim, J. H.; Mertens, R. T.; Agarwal, A.; Parkin, S.; Berger, G.; Awuah, S. G., Direct intramolecular carbon (sp2)-nitrogen(sp2) reductive elimination from gold(iii). *Dalton Trans.* 2019, 48 (18), 6273-6282.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A method of increasing mitochondrial respiration in a cell, comprising contacting the cell with an effective amount of a compound of formula (I) or formula (II) or a pharmaceutically acceptable salt thereof:

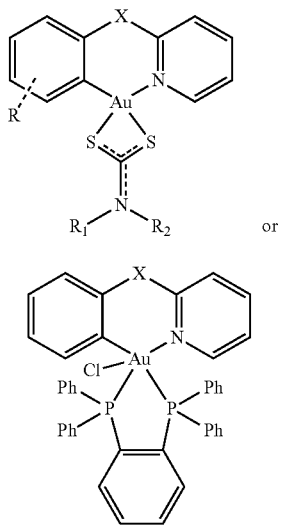

wherein,
X is selected from the group consisting of CH, C=O, C=NO-alkynyl, NH, O, S, or aryl;
R is selected from the group consisting of H, aryl, alkyl, electron withdrawing group (EWG), or electron donating group (EDG);
$R_1$ and $R_2$ are independently selected from the group consisting of alkyl and substituted alkyl, or, $R_1$ and $R_2$, taken together with the N to which they are bound, form a piperidine or piperazine that is optionally substituted with Z; and
Z is selected from the group consisting of haloaryl and alkoxyaryl.

2. The method of claim 1, wherein the cell is an intestinal epithelial cell (IECs).

3. The method of claim 1, wherein the cell is in a subject.

4. The method of claim 3, wherein the subject has been diagnosed with inflammatory bowel disease (IBD).

5. The method of claim 3, wherein the subject has been diagnosed with coronavirus induced enteritis.

6. The method of claim 1, wherein the compound has the following formula or a pharmaceutically acceptable salt thereof:

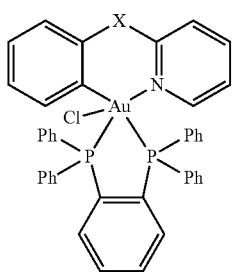

wherein X is C=O or CH.

7. The method of claim 1, wherein the compound has the following formula or a pharmaceutically acceptable salt thereof:

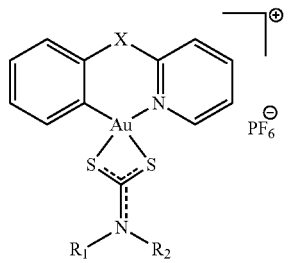

wherein,
X is selected from the group consisting of CH, C=O, C=NO-alkynyl, NH, O, S, or aryl;
$R_1$ and $R_2$ are independently selected from the group consisting of alkyl and substituted alkyl, or, $R_1$ and $R_2$, taken together with the N to which they are bound, form a piperidine or piperazine that is optionally substituted with Z; and
Z is selected from the group consisting of haloaryl and alkoxyaryl.

8. The method of claim 1, wherein the compound has the following formula or a pharmaceutically acceptable salt thereof:

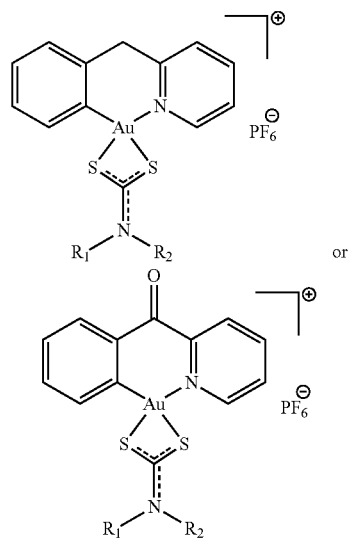

wherein,
$R_1$ and $R_2$ are independently selected from the group consisting of alkyl and substituted alkyl, or, $R_1$ and $R_2$, taken together with the N to which they are bound, form a piperidine or piperazine that is optionally substituted with Z; and
Z is selected from the group consisting of haloaryl and alkoxyaryl.

9. The method of claim 1, wherein the compound has the following formula or a pharmaceutically acceptable salt thereof:

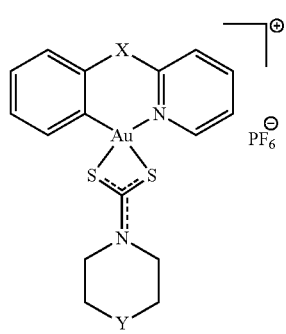

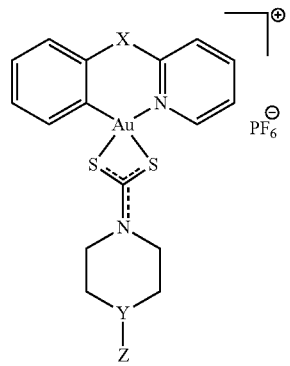

wherein,

X is selected from the group consisting of CH, C=O, C=NO-alkynyl, NH, O, S, or aryl; and Y is CH₂ or NH.

10. The method of claim 1, wherein the compound has the following formula or a pharmaceutically acceptable salt thereof:

wherein,

X is selected from the group consisting of CH, C=O, C=NO-alkynyl, NH, O, S, or aryl;

Y is CH or N; and

Z is haloaryl or alkoxyaryl.

12. The method of claim 1, wherein the compound has the following formula or a pharmaceutically acceptable salt thereof:

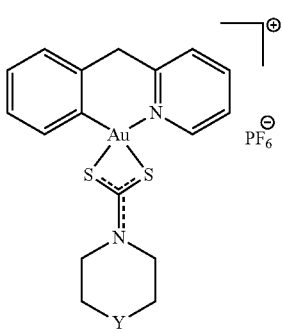

or

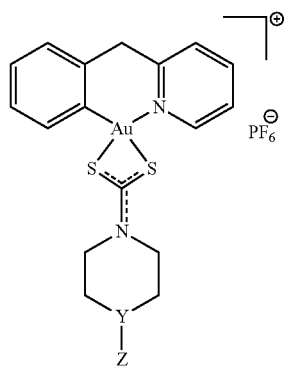

or

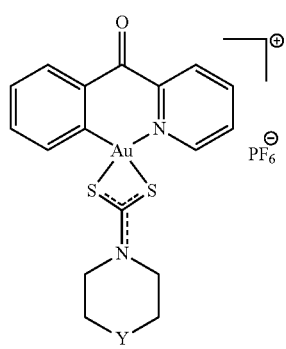

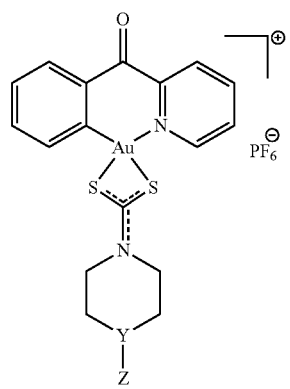

wherein Y is CH₂ or NH.

11. The method of claim 1, wherein the compound has the following formula or a pharmaceutically acceptable salt thereof:

wherein Y is CH or N, and Z is haloaryl or alkoxyaryl.

13. The method of claim 1, wherein the compound has the following formula or a pharmaceutically acceptable salt thereof:

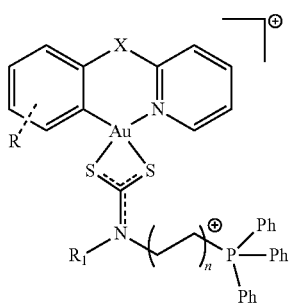

wherein,
X is selected from the group consisting of CH, C=O, C=NO-alkynyl, NH, O, S, or aryl;
R is selected from the group consisting of H, aryl, alkyl, electron withdrawing group (EWG), or electron donating group (EDG);
$R_1$ is selected from the group consisting of alkyl and substituted alkyl; and
n is 2, 4, 6, 8, 10, 12, or 16.

14. The method of claim 1, wherein the compound has the following formula or a pharmaceutically acceptable salt thereof:

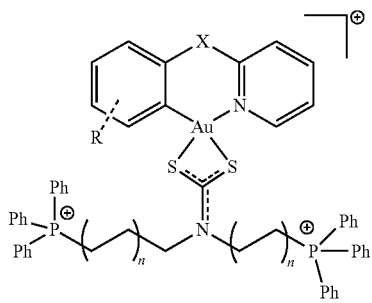

wherein,
X is selected from the group consisting of CH, C=O, C=NO-alkynyl, NH, O, S, or aryl;
R is selected from the group consisting of H, aryl, alkyl, electron withdrawing group (EWG), or electron donating group (EDG); and
each n is independently selected from 2, 4, 6, 8, 10, 12, or 16.

15. The method of claim 1, wherein X is:
(a) selected from the group consisting of CH and C=O;
(b) aryl, selected from the group consisting of phenyl (Ph), benzyl (Bz), thiophenyl, furyl, and pyridyl;
(c) selected from the group consisting of

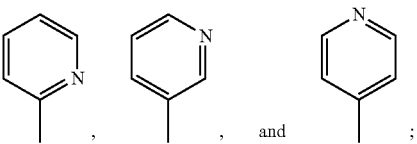

(d) X is C=NO-alkynyl.

16. The method of claim 1, wherein R is in ortho, para, or meta position to Au.

17. The method of claim 1, wherein R is:
(a) aryl, selected from the group consisting of Ph, Bz, thiophenyl, furyl, and pyridyl;
(b) alkyl including 1, 2, 3, 4, 5, 6, 7, or 8 carbon atoms;
(c) EWG, selected from the group consisting of —$CF_3$, —$NO_2$, —F, —Br, —Cl, Aldehyde —COH, —COOH, and —CN; or
(d) EDG, selected from the group consisting of —$OCH_3$, —OH, $CH_3$, —C≡C, -alkynyl group, and —$NH_2$.

18. The method of claim 1, wherein $R_1$ is:
(a) alkyl including 1-33 carbon atoms;
(b)

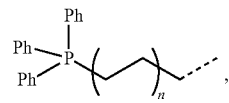

wherein n is 2, 4, 6, 8, 10, 12, or 16; or
(c) methyl or ethyl.

19. The method of claim 1, wherein $R_2$ is:
(a) alkyl including 1-32 carbon atoms;
(b)

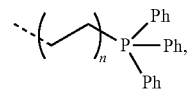

wherein n is 2, 4, 6, 8, 10, 12, or 16; or
(c) methyl or ethyl.

20. The method of claim 1, wherein $R_1$ and $R_2$, taken together with the N to which they are bound, form (a) a piperidine or piperazine that is not substituted, or (b) a piperidine or piperazine that is substituted with Z.

* * * * *